(12) United States Patent
Richardson et al.

(10) Patent No.: US 10,859,148 B1
(45) Date of Patent: Dec. 8, 2020

(54) MODULAR PORTING MANIFOLD AND MOTOR END COVER FOR HYDROSTATIC TRANSMISSION

(71) Applicant: Parker-Hannifin Corporation, Cleveland, OH (US)

(72) Inventors: Jason Scot Richardson, Chuckey, TN (US); Thomas Kevin Castle, Morristown, TN (US); David Mark Heathcoat, Jr., Greenville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/395,606

(22) Filed: Apr. 26, 2019

Related U.S. Application Data

(60) Provisional application No. 62/666,333, filed on May 3, 2018.

(51) Int. Cl.
  *F16H 39/06* (2006.01)
  *F04B 17/06* (2006.01)

(52) U.S. Cl.
  CPC ............. *F16H 39/06* (2013.01); *F04B 17/06* (2013.01)

(58) Field of Classification Search
  CPC .................................. F16H 39/06; F04B 17/06
  See application file for complete search history.

(56) References Cited

U.S. PATENT DOCUMENTS

| 7,383,683 | B1  | 6/2008  | Rawski |
| 7,497,082 | B1* | 3/2009  | Bennett ................ B60K 17/105 60/453 |
| 8,100,204 | B2* | 1/2012  | Dong ................... B60K 7/0015 180/308 |
| 8,635,867 | B2* | 1/2014  | Dong .................... F03C 1/0663 417/269 |
| 9,151,374 | B2* | 10/2015 | Richardson ............. F16H 39/04 |
| 9,677,653 | B1* | 6/2017  | Bennett .................. F16H 39/08 |
| 2016/0003336 | A1 | 1/2016 | Crosby et al. |

\* cited by examiner

*Primary Examiner* — Thomas E Lazo
(74) *Attorney, Agent, or Firm* — Renner, Otto, Boisselle & Sklar, LLP

(57) ABSTRACT

A modular porting manifold for a hydrostatic transmission that serves as an end cover for the hydraulic motor, and which may be modularly interfaced with multiple different pump configurations having the same or similar pump interface across the different pump configurations. A pump interfacing section of the porting manifold may have a mating surface that interfaces with a corresponding mating surface of an outwardly addressable manifold of the pump. The pump interfacing section of the porting manifold may have at least two ports for communication of hydraulic fluid with the pump, in which the at least two ports are laterally spaced apart in the same horizontal plane to align with at least two corresponding ports on the pump manifold that are also in the same horizontal plane, which may provide less complex and easier to manufacture flow passages for the porting manifold and/or pump end block.

20 Claims, 21 Drawing Sheets

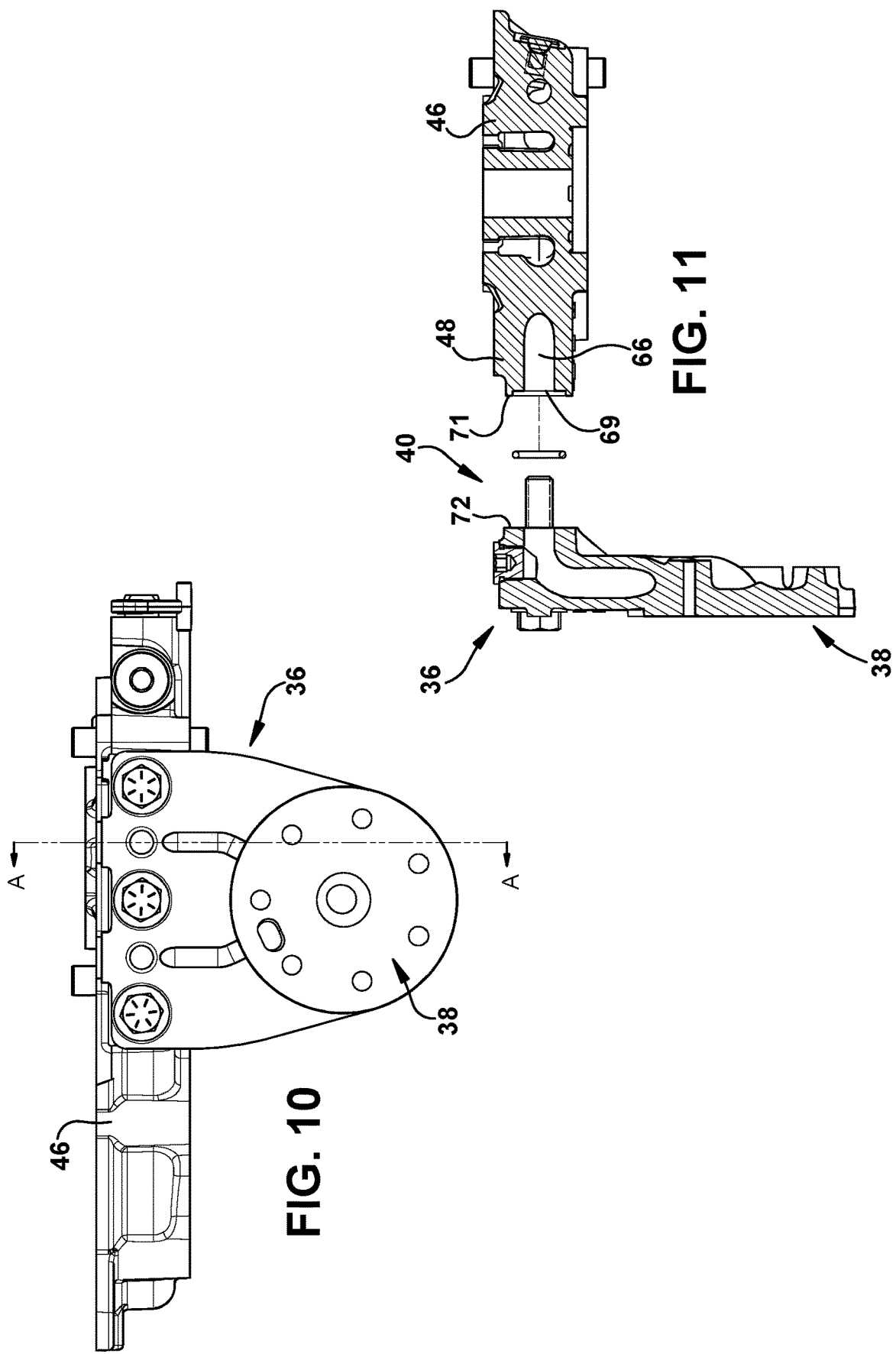

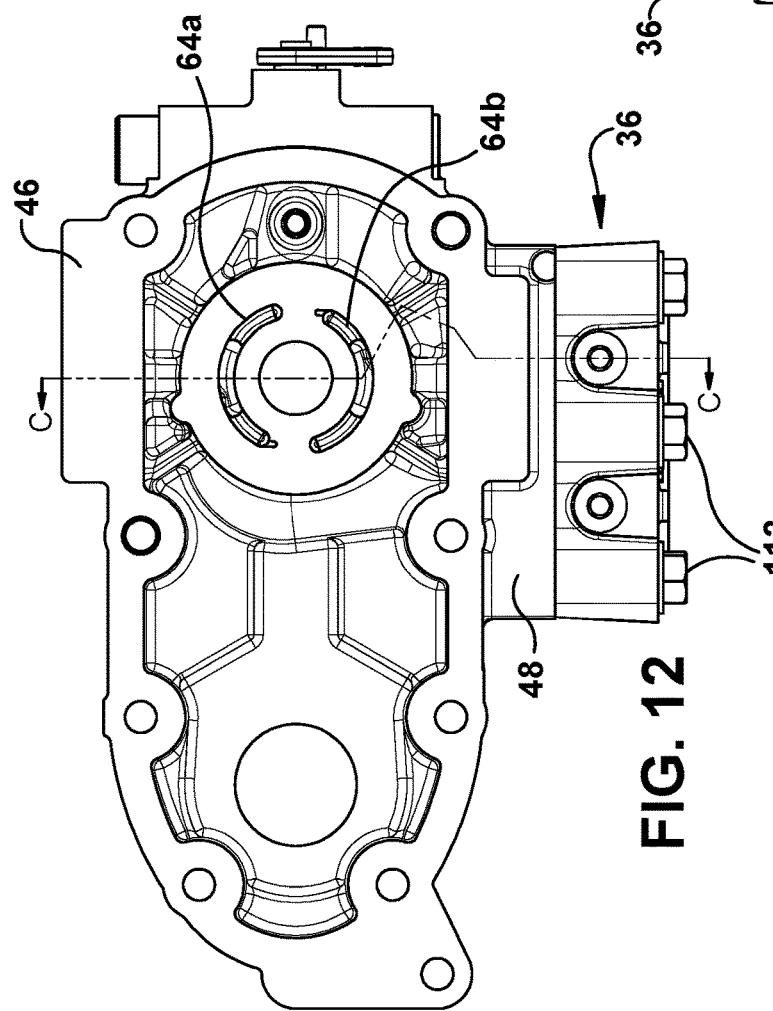
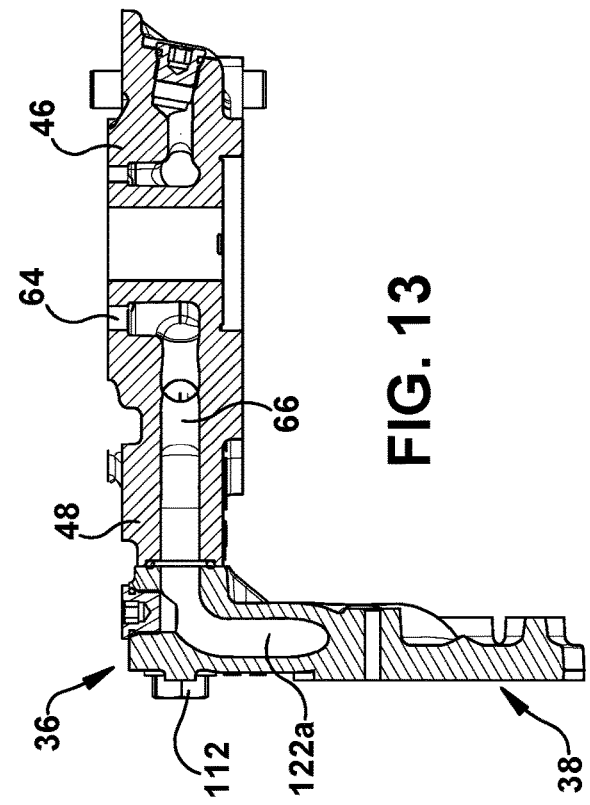
FIG. 12
FIG. 13

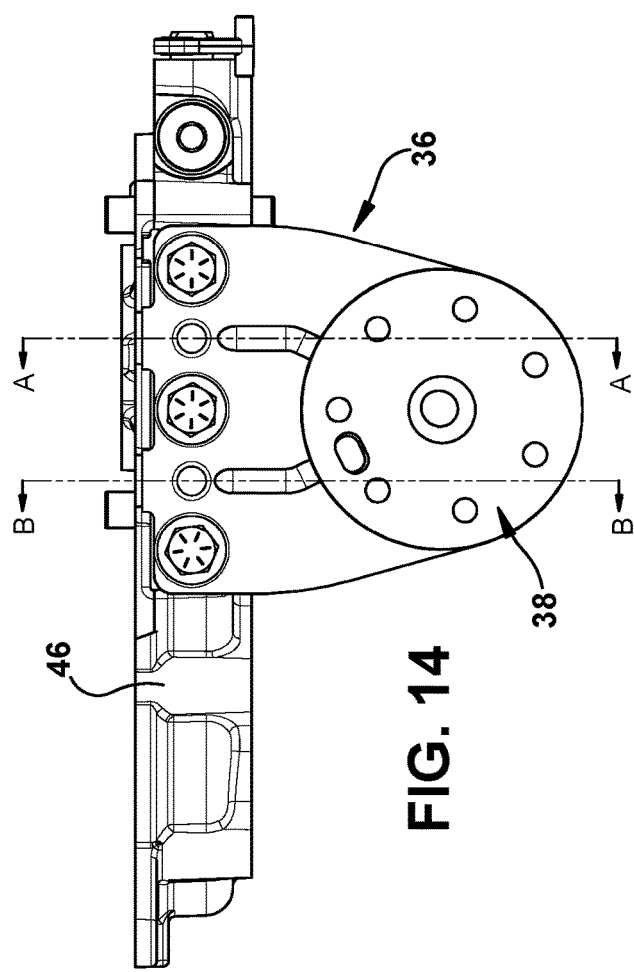
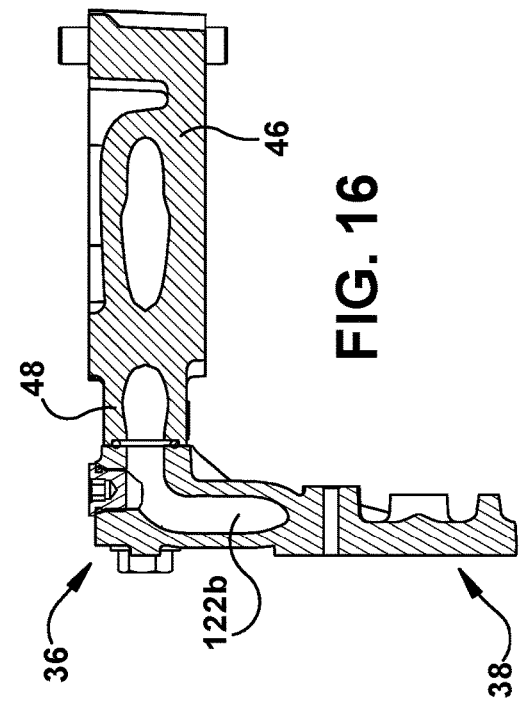
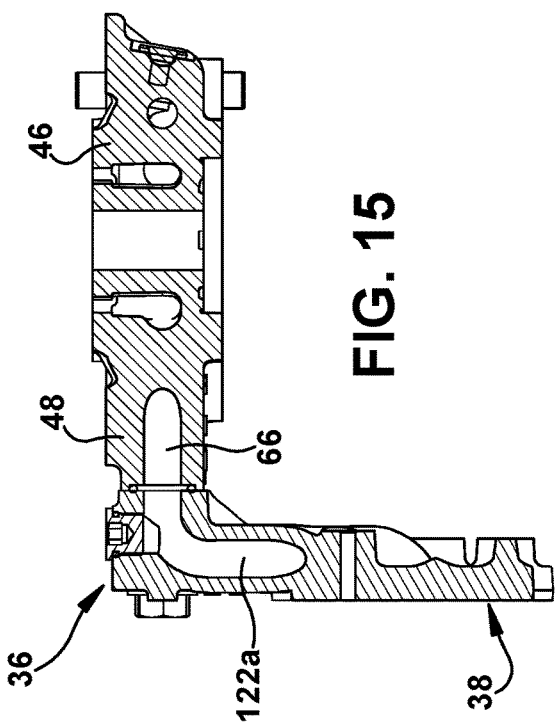

MODULAR PORTING MANIFOLD AND MOTOR END COVER FOR HYDROSTATIC TRANSMISSION

RELATED APPLICATIONS

This application claims the benefit of U.S. Provisional Application No. 62/666,333 filed May 3, 2018, which is hereby incorporated herein by reference.

FIELD OF INVENTION

The present invention relates generally to transmissions, and more particularly to a hydrostatic transmission having a pump, a motor, and a modular porting manifold that may serve as an end cover to the motor and provides a fluid connection between the pump and motor for the flow of hydraulic fluid.

BACKGROUND

A prime mover, such as an internal combustion engine or the like, can be connected to a high speed, low torque hydrostatic transmission that may be directly mounted to a mechanical speed reduction device, such as a gearbox. A hydrostatic transmission is particularly suitable to provide traction drive for a light vehicle, such as turf machines, lawn tractors, ride-on lawn mowers, and like devices. A hydrostatic transmission may be connected to a variety of gearboxes and transaxles, so the same components can be utilized on a wide variety of light vehicle models. A simple usage of hydrostatic transmissions is on zero-turn radius vehicles, including zero-turn radius mowers and tractors.

Generally, a hydrostatic transmission includes a hydraulic pump and a hydraulic motor. The hydraulic pump usually is a piston-type pump including a plurality of reciprocating pistons which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor, which allows the transmission output speed to be varied and controlled. The rotation of the hydraulic motor may be used to drive an output shaft, which in turn ultimately drives a wheel axle of a light vehicle of the types described above.

Because of the size constraints associated with light vehicles, it has been difficult to provide a hydrostatic transmission that is compact, cost effective, and easy to assemble. Some current solutions for hydrostatic transmissions integrate components of the pump with components of the motor, rather than providing them as modular components. For example, some current hydrostatic transmissions have a pump housing connected to a pump end block, in which a portion of the end block serves as a porting manifold that is integral with an end cover of the motor housing. Such designs typically require long and more complex compound angle passages through the end block for passing hydraulic fluid between the pump and motor. Such integral and non-modular designs also limit the ability to interchange components across multiple different hydrostatic transmission configurations, which would be desirable to provide flexibility of usage with different types of light vehicle configurations.

SUMMARY OF INVENTION

The present disclosure provides a unique hydrostatic transmission, and more particularly an enhanced modular porting manifold for a hydrostatic transmission that serves as an end cover for the hydraulic motor, and which may be modularly interfaced with multiple different pump configurations having the same or similar pump interface across the different pump configurations.

More specifically, the pump interfacing section of the modular porting manifold may have a mating surface that interfaces with a corresponding mating surface of a manifold of the pump. The pump manifold may be configured to be the same or similar across many different pump configurations to allow the same modular porting manifold and motor end cover, and thus motor subassembly, to be used across the many different pump configurations.

The pump interfacing section of the porting manifold may have at least two ports for communication of hydraulic fluid with the pump, in which the at least two ports are laterally spaced apart in the same horizontal plane to align with at least two corresponding ports on the pump manifold that are also in the same horizontal plane. Such a configuration allows the pump end block to be more simply constructed with all of the internal fluid passages in a single horizontal plane, which reduces complexity and cost of manufacture. Similarly, the configuration of the modular porting manifold also may be more simply constructed with shorter and less complex internal fluid passages. Such configurations may enhance the ease of manufacture of the end block and the modular porting manifold, particularly using conventional sand-casting processes that are known in the art.

Alternatively or additionally, the motor interfacing section of the modular porting manifold may be configured to be the same or similar across many different motor configurations to allow the same modular porting manifold to serve as the motor end cover for different motor subassemblies across the many different motor configurations.

According to an aspect of the present disclosure, a hydrostatic transmission includes: a hydraulic pump having a pump housing and a pump end block connected to the pump housing, the pump end block having an outer pump manifold with one or more ports opening outwardly of the pump end block and the pump housing; a hydraulic motor having a motor housing and an output shaft extending outwardly of the motor housing; and a porting manifold coupled to each of the hydraulic pump and the hydraulic motor, the porting manifold being discrete with respect to each of the pump and the motor, and being interposed between the pump and the motor outside of the pump housing, the porting manifold having a motor interfacing section that interfaces with the motor, and a pump interfacing section that interfaces with the pump; wherein: the motor interfacing section forms an end cover for the motor, the motor interfacing section having one or more motor ports opening into the motor for communication of hydraulic fluid with the motor; the pump interfacing section interfaces with the outer pump manifold of the pump, the pump interfacing section having one or more pump ports aligned with a corresponding one or more ports on the pump manifold for communication of hydraulic fluid with the pump; and the porting manifold having one or more internal fluid passages fluidly connecting the pump ports of the pump interfacing section with the motor ports of the motor interfacing section for enabling fluid communication between the pump and the motor.

According to another aspect of the present disclosure, a modular porting manifold is provided for a hydrostatic transmission having a pump and a motor, the modular porting manifold including: a motor interfacing section configured to interface with the motor, in which the motor interfacing section is configured to form an end cover for the motor to which the motor can be secured, the motor interfacing section having at least two motor ports configured to open into the motor for enabling fluid communication with the motor when the modular porting manifold is coupled to the motor; and a pump interfacing section configured to interface with a pump manifold of the pump, the pump interfacing section having at least two pump ports configured to cooperate with a corresponding at least two ports on the pump manifold for enabling fluid communication with the pump when the modular porting manifold is coupled to the pump; wherein the modular porting manifold has at least two internal fluid passages fluidly connecting the at least two pump ports of the pump interfacing section with the at least two motor ports of the motor interfacing section for enabling fluid communication between the pump and the motor when the modular porting manifold is coupled to each of the pump and the motor; and wherein the pump interfacing section of the modular porting manifold has a pump mating surface for interfacing with a corresponding mating surface of the pump manifold, the pump mating surface of the modular porting manifold having the at least two pump ports, in which the at least two pump ports are laterally spaced apart in the same horizontal plane. According to another aspect of the present disclosure, a motor subassembly for a hydrostatic transmission includes: the modular porting manifold having one or more of the features described above, in which the motor subassembly further includes a hydraulic motor coupled to the porting manifold, the hydraulic motor having a motor housing and an output shaft extending outwardly of the motor housing; wherein the motor interfacing section of the porting manifold forms an end cover of the motor, and the one or more motor ports are encompassed by the motor, and open into the motor for communication of hydraulic fluid with the motor.

According to another aspect of the present disclosure, a method of modularly assembling a plurality of hydrostatic transmissions includes the steps of: (i) providing a plurality of motor subassemblies, each having a modular porting manifold with one or more of the above-described features, and a motor secured to a motor interfacing section of the porting manifold that is opposite a pump interfacing section of the porting manifold, in which the motor interfacing section forms an end cover of the motor; (ii) providing a plurality of hydraulic pumps, in which at least some of the plurality of hydraulic pumps are different, except that each different pump includes the same pump manifold interface that is disposed outwardly of a housing of the pump, and is configured to interface with the pump interfacing section of the modular porting manifold to enable fluid communication therebetween; and (iii) securing each one of the plurality of motor subassemblies to a corresponding each one of the plurality of hydraulic pumps outside of the housing of the pump.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 10 is an exploded side view of the pump end cover and porting manifold in FIG. 7.

FIG. 11 is an exploded cross-sectional view of the pump end cover and porting manifold taken along the line A-A in FIG. 10.

FIG. 12 is a top plan view of the pump end cover connected to the porting manifold.

FIG. 13 is a cross-sectional view of the pump end cover and porting manifold taken along the line C-C in FIG. 12.

FIG. 14 is side view of the pump end cover connected to the porting manifold.

FIG. 15 is a cross-sectional view of the pump end cover and porting manifold taken along the line A-A in FIG. 14.

FIG. 16 is a cross-sectional view of the pump end cover and porting manifold taken along the line B-B in FIG. 14

DETAILED DESCRIPTION

The principles of the present disclosure have particular application to light vehicles, such as zero-turn-radius mowers, and thus will be described below chiefly in this context. It is understood, however, that the principles and aspects according to the present disclosure may be applicable to other vehicles, such as vehicles utilizing mechanical, hydrostatic, hydraulic, or electric drive systems.

Figure 1:
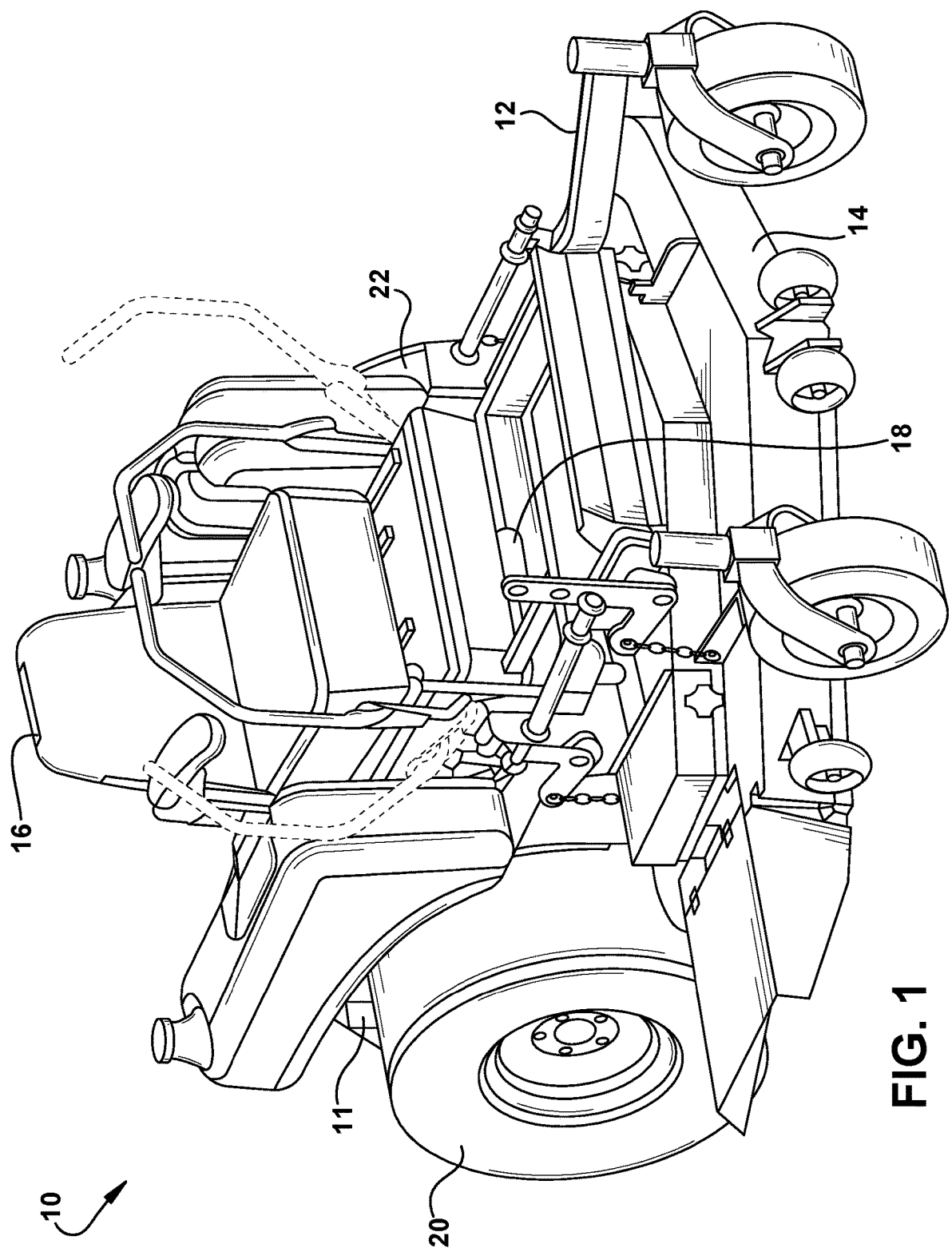
FIG. 1 is a perspective view of an exemplary zero-turn-radius mower employing a hydrostatic transmission in accordance with embodiments of the present disclosure.

Referring to FIG. 1, an exemplary zero-turn-radius mower 10 is shown. The mower 10 may include a frame 12, a mower deck 14 supported by the frame 12, an operator seat 16, and a plurality of controls 18 for operating the mower 10. A rear mounted engine 11 may be mounted to the frame 12 behind the seat 16 to provide power to a hydraulic axle combination mounted to the frame 12, the hydraulic axle combination, including hydrostatic transmissions (not shown in FIG. 1), such as a right-hand hydrostatic transmission 30 (FIG. 2) and a left-hand hydrostatic transmission 31 (not shown), which are essentially mirror images of each other. The hydrostatic transmissions can be controlled by an operator to independently drive respective rear wheels 20 to propel the mower 10 and provide zero-turn-radius functionality.

The design of the illustrated mower 10 is merely exemplary in nature, and it will be appreciated that other mower designs and vehicle types can be used in accordance with the present disclosure. For example, in an alternative light vehicle configuration, a modular hydrostatic transaxle system includes a single hydrostatic transmission attached to a transaxle including a differential gearing system and an axle shaft. It is furthermore understood that in a dual hydrostatic transmission system as described above, the right-hand and left-hand transmissions have comparable components, although the precise configuration of the components relative to each other may differ because of the differing relative position of the right-side wheel relative to the right-side transmission, versus the position of the left-side wheel relative to the left side transmission. In particular, certain components may be flipped and/or mirror imaged to accommodate the right-side wheel versus the left-side wheel, although the components on both sides generally are comparable. For convenience, the right-hand hydrostatic transmission 30 first will be described.

Figure 2:
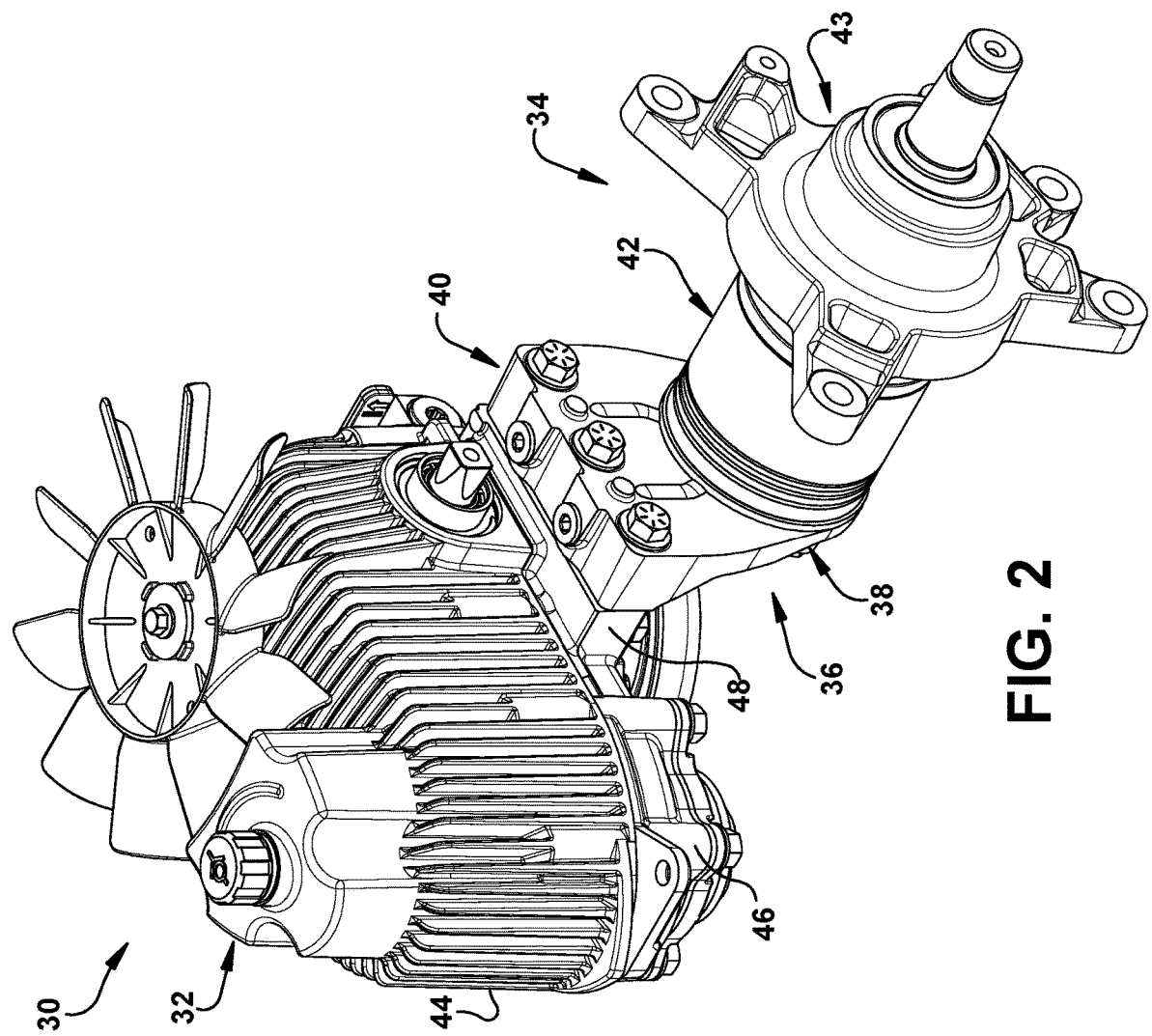
FIG. 2 is a front perspective view of an exemplary hydrostatic transmission having an exemplary porting manifold in accordance with embodiments of the present disclosure.
Figure 3:
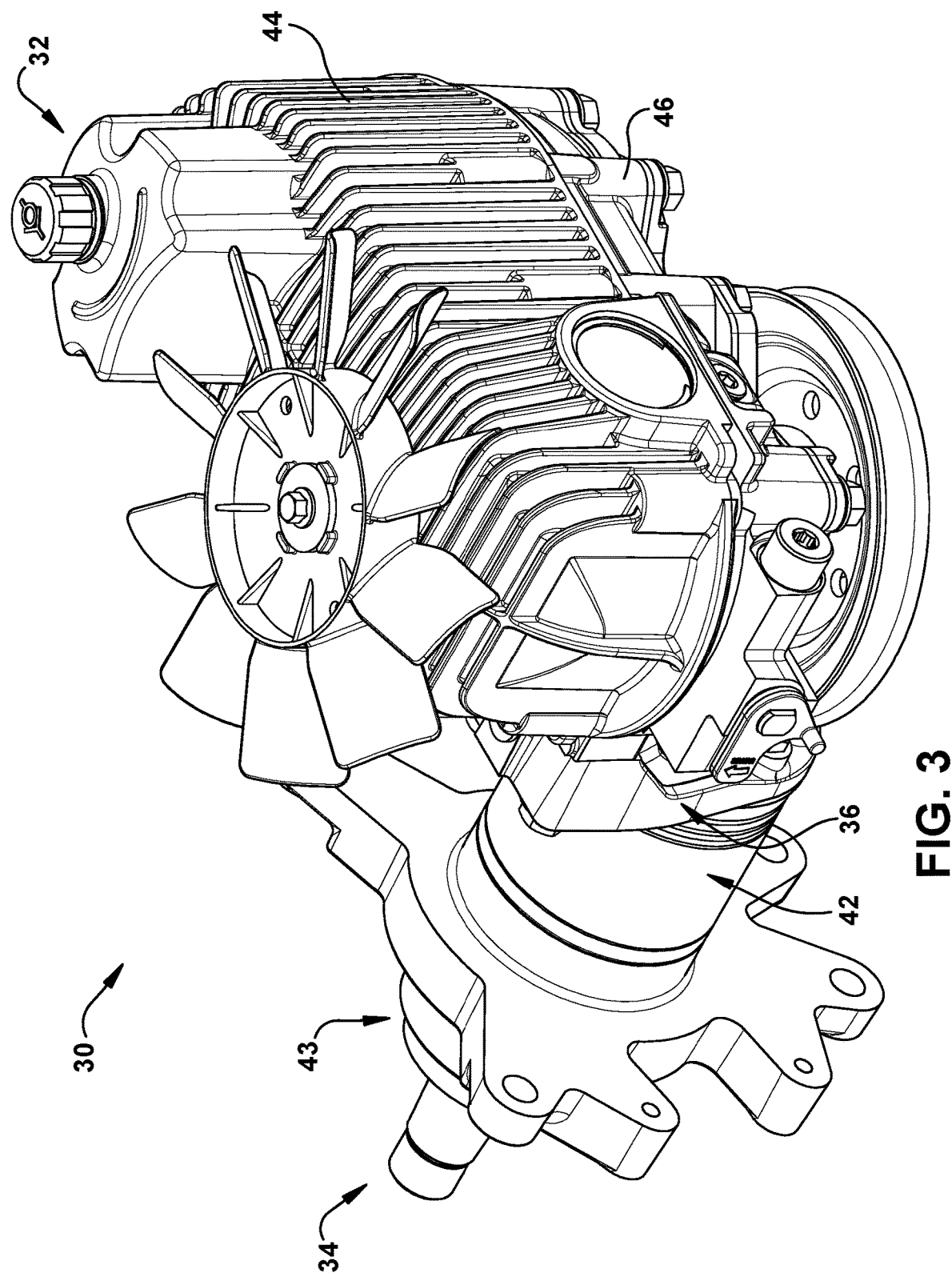
FIG. 3 is a rear perspective view of the hydrostatic transmission.
Figure 4:
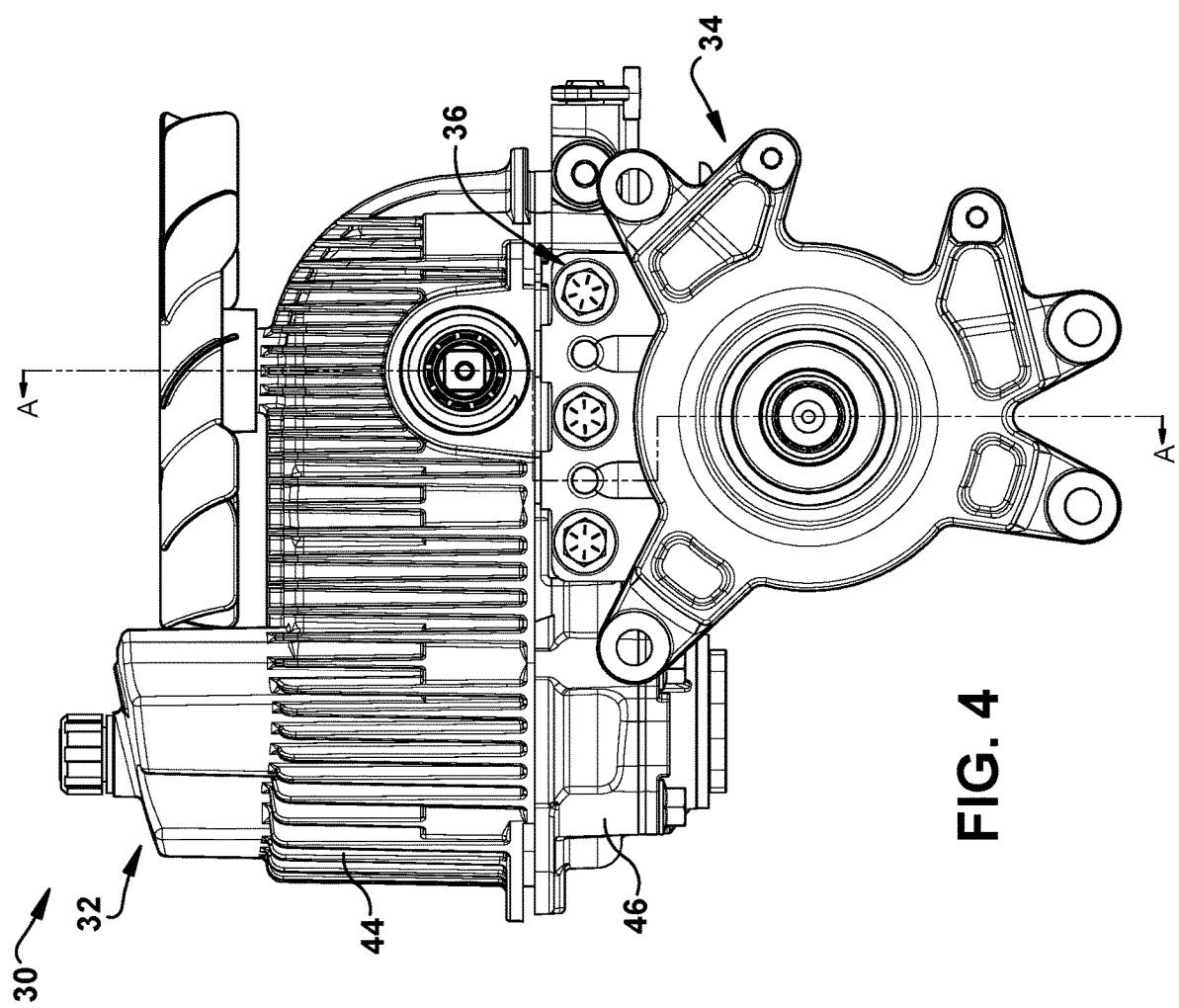
FIG. 4 is a side view of the hydrostatic transmission.
Figure 17:
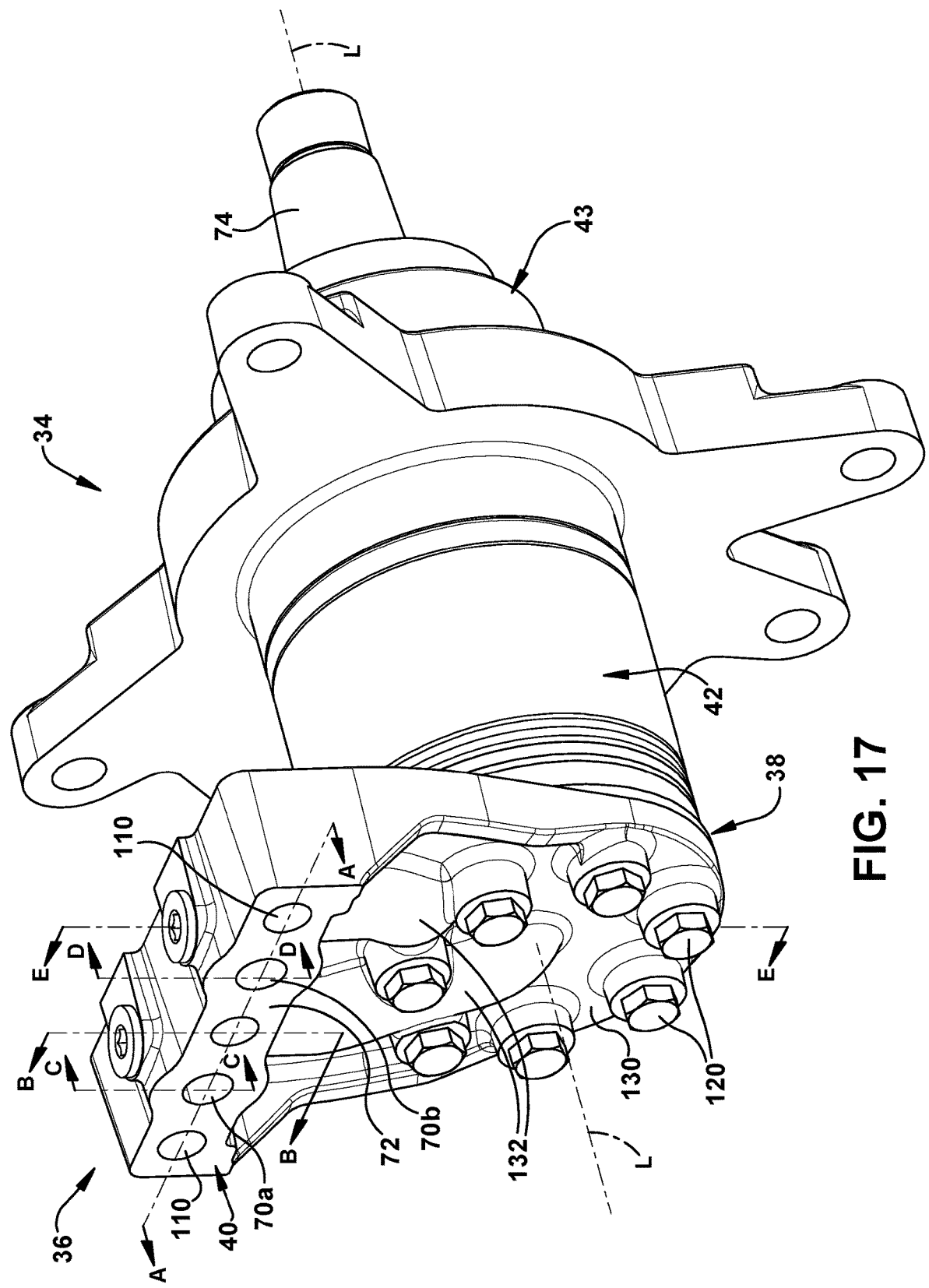
FIG. 17 is a rear perspective view of the exemplary porting manifold and exemplary motor in FIG. 2, which combined form an exemplary motor sub-assembly.
Figure 18:
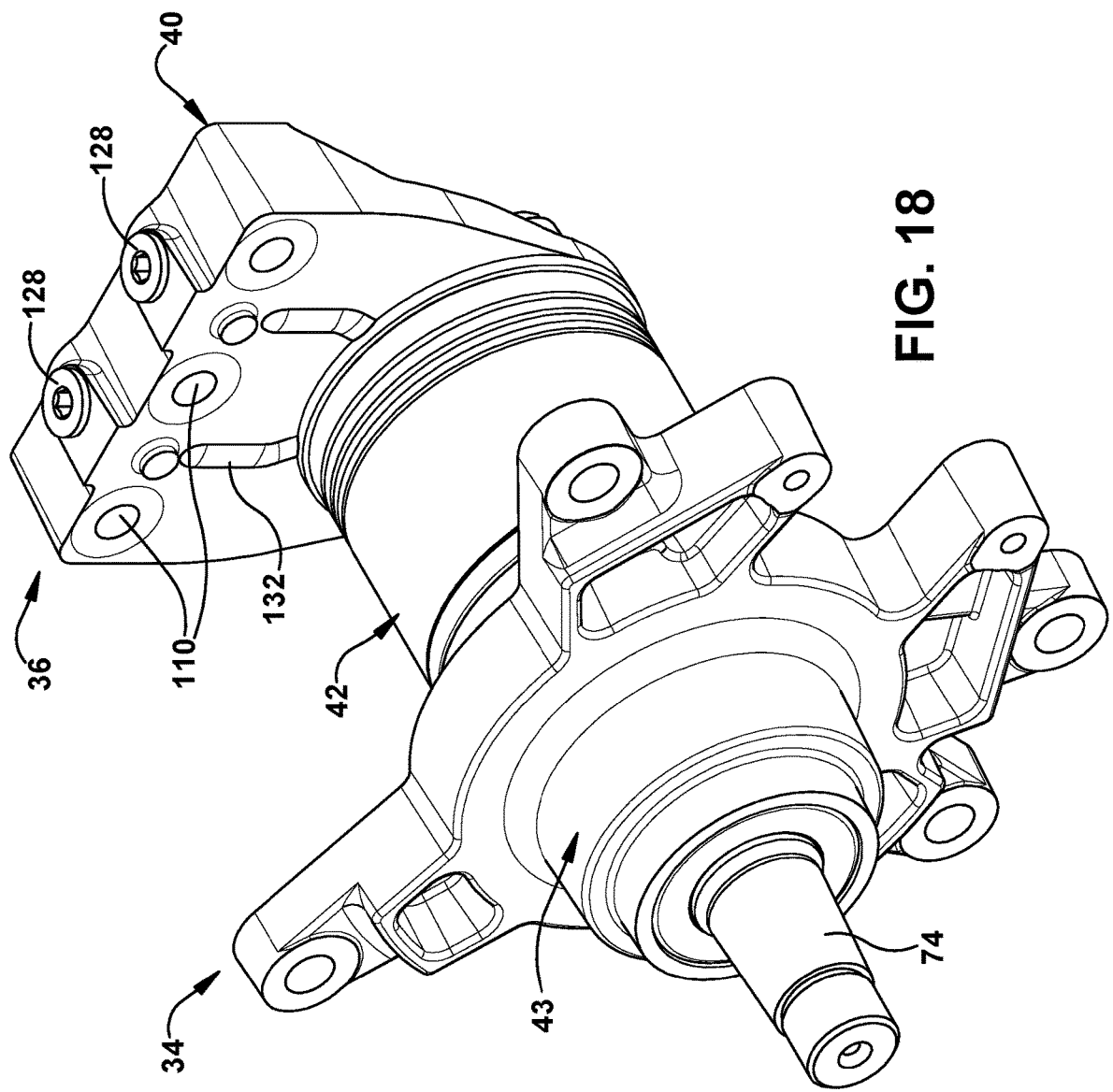
FIG. 18 is a front perspective view of the porting manifold and motor in FIG. 17.
Figure 20:
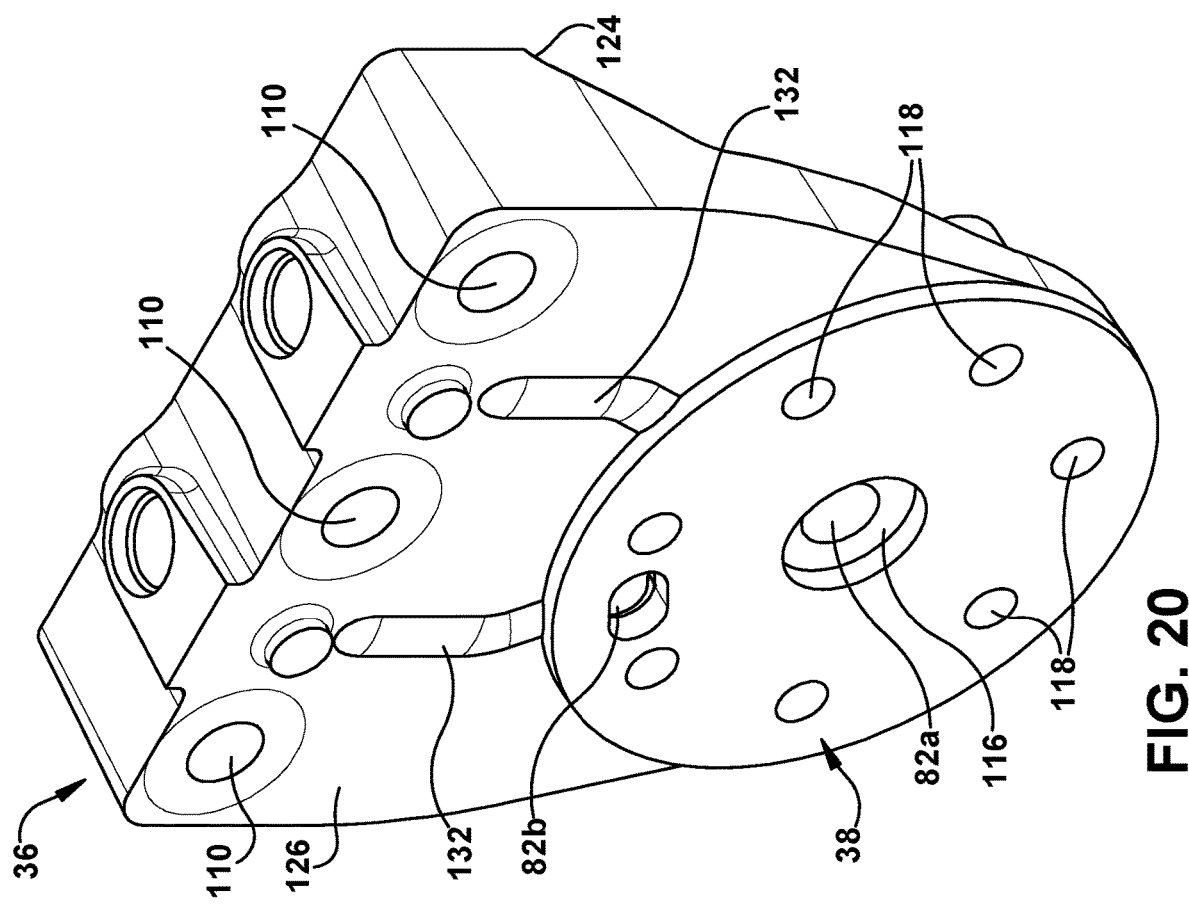
FIG. 20 is a front perspective view of the exemplary porting manifold.

Referring to FIGS. 2-4, the hydrostatic transmission 30 may be characterized as including the following generalized components. The hydrostatic transmission 30 includes a hydraulic pump assembly 32, a hydraulic motor assembly 34, and a porting manifold 36 that is discrete (individually separate and distinct) with respect to each of the pump 32 and the motor 34. As shown, the porting manifold 36 is interposed between the pump 32 and the motor 34, and has a motor interfacing section 38 configured to interface with the motor 34, and a pump interfacing section 40 configured to interface with the pump 32. As discussed in further detail below, the porting manifold 36 includes one or more pump ports 70a, 70b (shown in FIG. 17) on the pump interfacing section 40 for fluid communication with the pump 32, one or more motor ports 82a, 82b (shown in FIG. 20) on the motor interfacing section 38 for fluid communication with the motor 34, and one or more internal fluid passages 122a, 122b (shown in FIG. 21) extending through the porting manifold 36 for fluidly connecting the pump ports with the motor ports to transmit hydraulic fluid between the pump 32 and the motor 34 for operation of the hydrostatic transmission 30.

Figure 5:
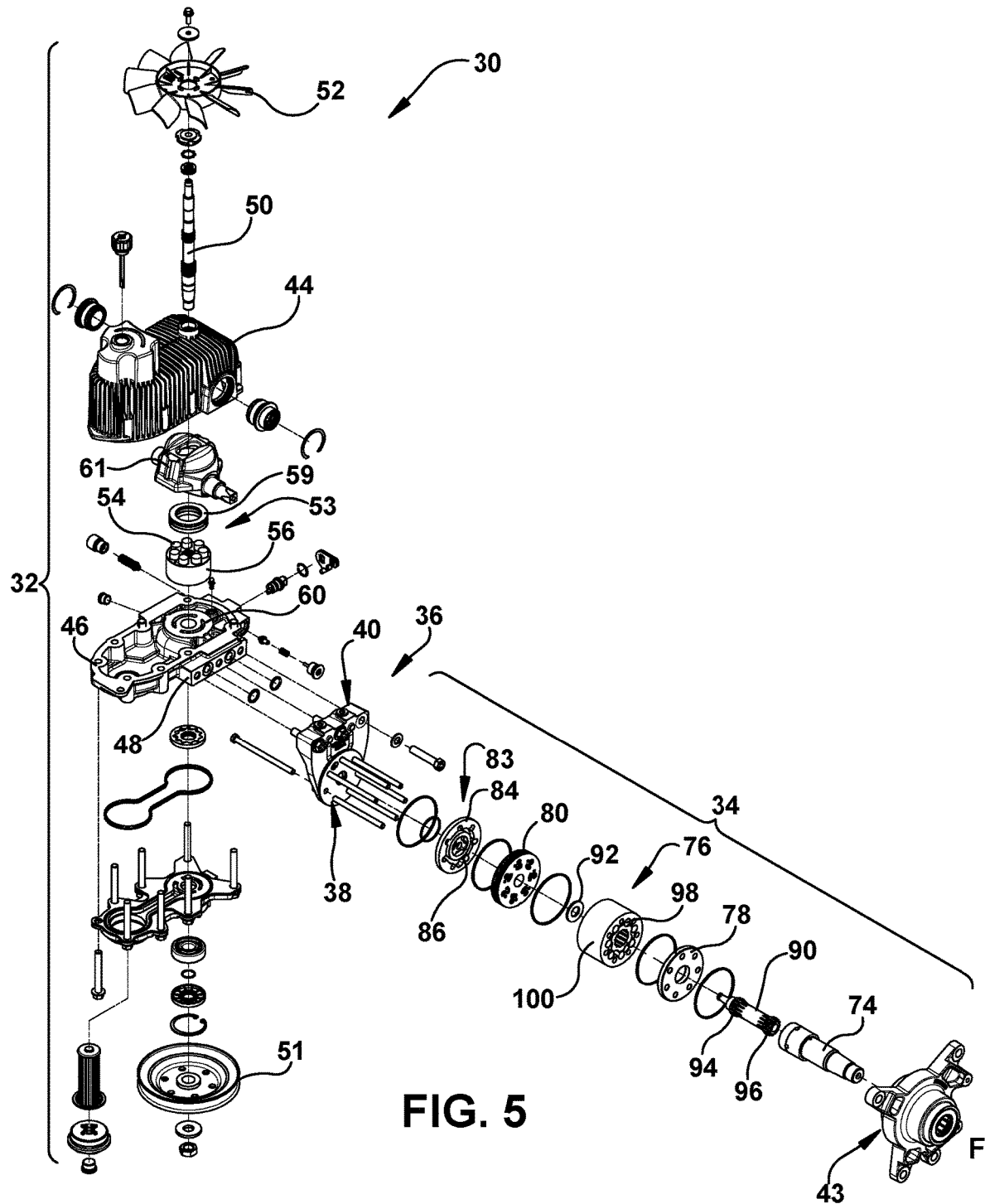
FIG. 5 is an exploded perspective view of the exemplary hydrostatic transmission in FIG. 2.

The hydraulic motor 34 may be any suitable motor, such as a low speed, high torque hydraulic motor. Generally, the hydraulic motor 34 includes a motor subassembly portion 42, which may contain an internal rotor set, and a motor housing portion 43 with an output shaft extending outwardly of the motor housing (as shown in FIG. 5, for example). As shown, the motor interfacing section 38 of the exemplary porting manifold 36 forms an end cover for the motor 34, such as at the motor subassembly 42, in which the one or more motor ports 82a, 82b (shown in FIG. 20) of the porting manifold 36 are configured to open into the motor 34 for communication of hydraulic fluid with the motor 34, as discussed in further detail below.

Figure 7:
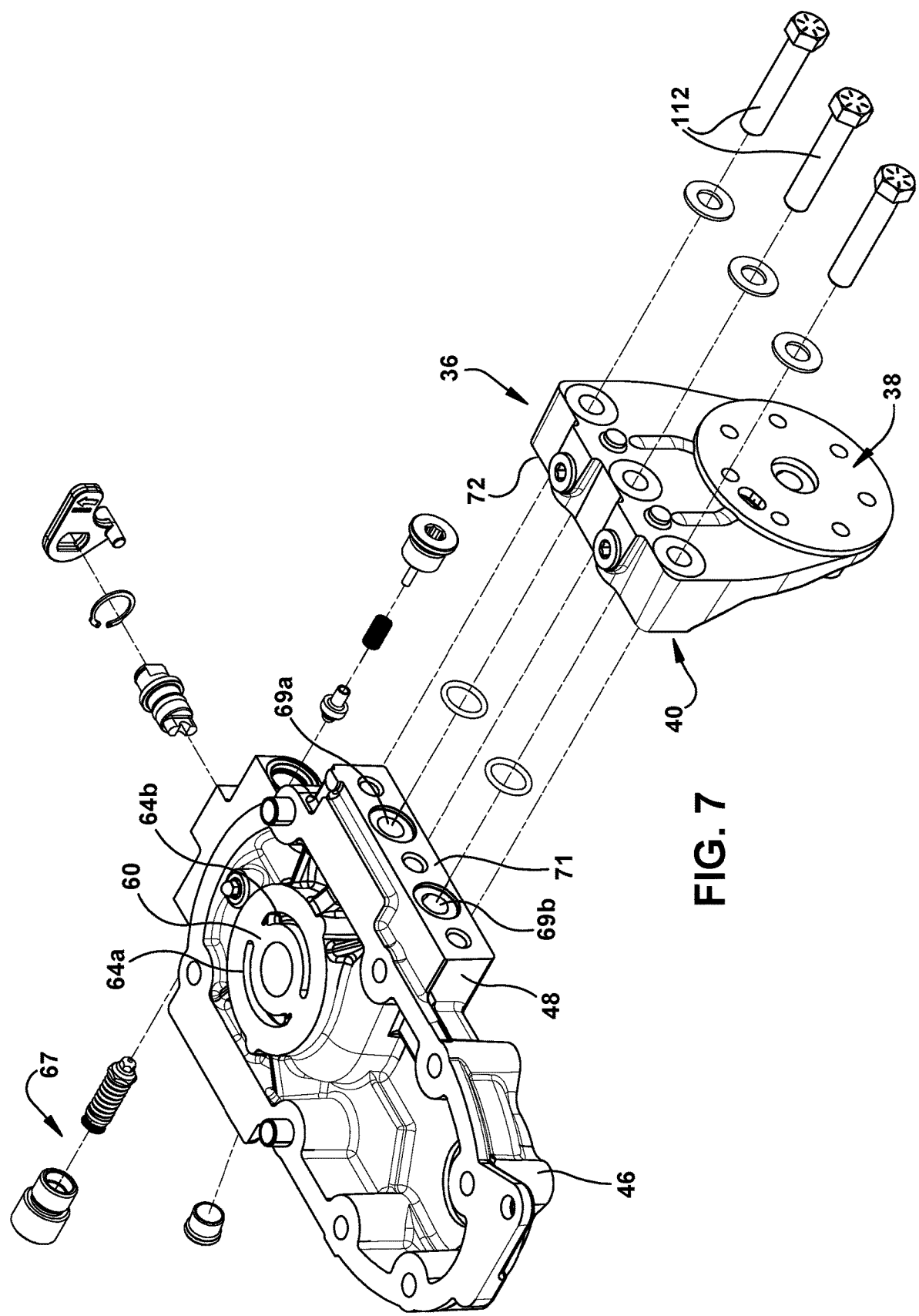
FIG. 7 is an enlarged exploded view of the hydrostatic transmission in FIG. 5 showing the exemplary porting manifold and an exemplary pump end cover.

The hydraulic pump assembly 32 may include any suitable pump, such as a variable displacement piston pump. Generally, the hydraulic pump assembly 32 includes a top housing 44 and a pump end block 46 connected to the underside of the pump housing 44, such that the housing 44 and end block 46 cooperate to form a reservoir for the hydraulic fluid, and also form an enclosure for the hydraulic pump, as discussed in further detail below. As shown, the pump end block 46 has an outer pump manifold 48 in which one or more ports 69a, 69b open outwardly of the pump end block 46 (as shown in FIG. 7, for example). In the illustrated embodiment, the pump manifold 48 extends outwardly from one side of the pump end block 46 and terminates at an outwardly addressable mating surface 71 (shown in FIG. 7) that is configured to interface with a corresponding mating surface 72 (shown in FIG. 17) of the pump interfacing section 40 of the porting manifold 36. In this manner, the outer pump manifold 48 is configured to interface with the pump interfacing section 40 of the porting manifold 36, such that the one or more pump ports 70a, 70b (shown in FIG. 17) of the porting manifold 36 aligned with the corresponding one or more ports 69a, 69b (shown in FIG. 7) on the pump manifold 48 for communication of hydraulic fluid with the pump 32.

According to an aspect of the present disclosure, the discrete and modular porting manifold 36 provides a relatively simple and cost-effective construction with short and relatively simple internal fluid passages that fluidly connect the pump 32 to the motor 34. In addition, by configuring the manifold 48 of the pump 32 to modularly interface with the porting manifold 36, the end block 46 also may have a relatively simple construction with less complex flow paths. Furthermore, such configuration(s) allow for enhanced modularity in which the same porting manifold 36 (optionally in combination with the motor 34 to form a motor sub-assembly) may be used across many different pump configurations, including left-hand and right-hand units, pumps with different shaped housings, different pump internals and end block configurations, among other different pump configurations.

Figure 6:
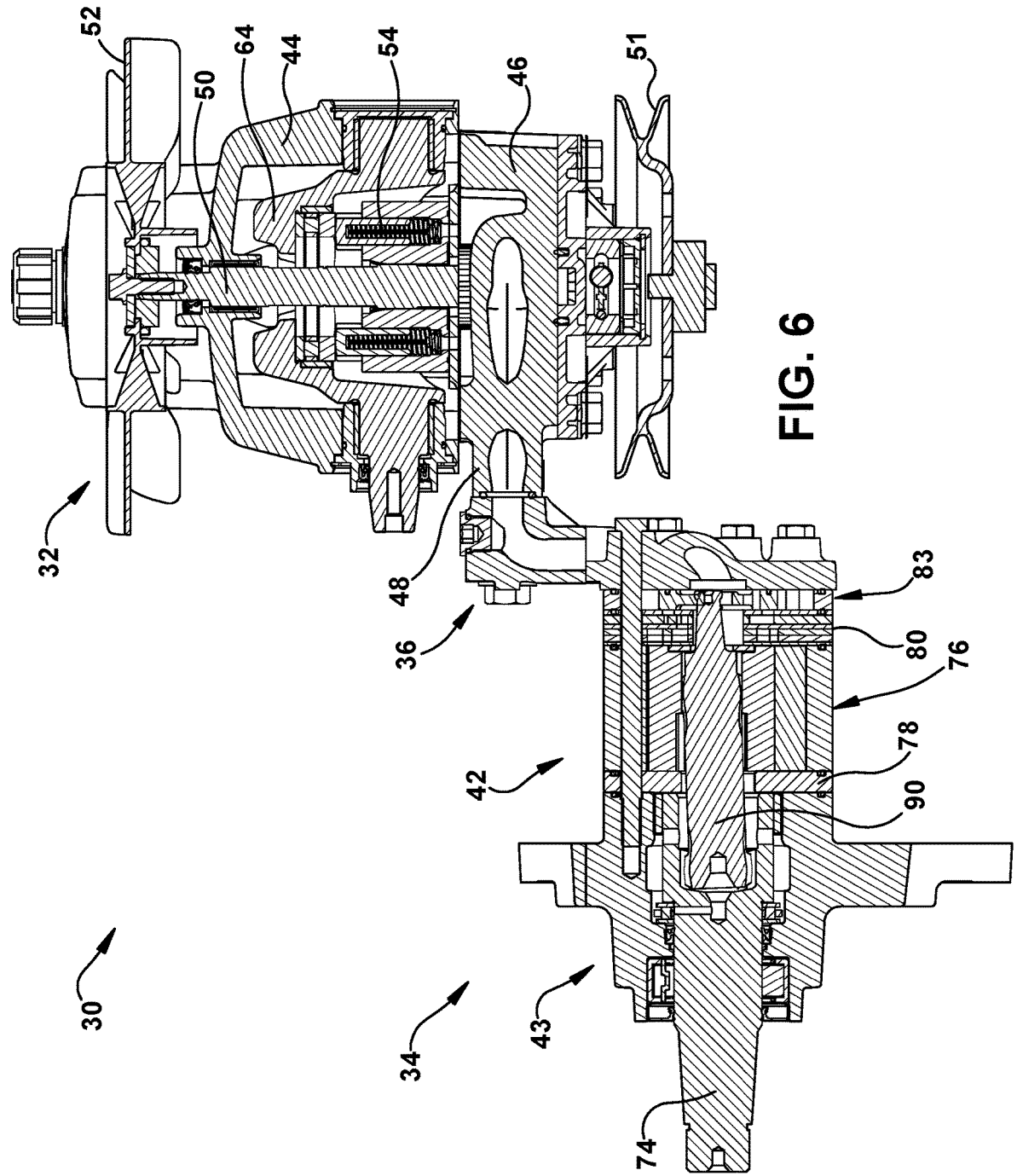
FIG. 6 is a cross-sectional view of the hydrostatic transmission taken along the line A-A in FIG. 4.

Referring to FIGS. 5 and 6, the exemplary hydrostatic transmission 30 is shown in exploded view and cross-sectional view, respectively, for further detailing the various components of the hydraulic pump assembly 32 and the hydraulic motor assembly 34. As shown, the hydraulic pump assembly 32 includes an input shaft 50 that extends into the top housing 44 through a bore. A portion of the input shaft 50 extends outward from the top of housing 44. The input shaft 50 further extends through an input belt pulley 51 and a fan 52 that operates to provide cooling for the hydrostatic transmission. Alternatively, other methods of power input may be employed, such as a sprocket for use with a chain drive or a shaft mounted direct drive coupling.

As discussed above, the top pump housing 44 is connected at its underside to the pump end block 46 to form a reservoir for the hydraulic fluid. Within the pump housing 44, a piston rotating group 53 is provided, which includes a plurality of pistons 54 that are supported on a barrel 56. The piston rotating group further includes a barrel spring and washer that hold the barrel running face to an end block running face 60. The input shaft 50 drives the piston rotating group 52 such that the piston rotating group rotates against the pump running face 60 of the end block 46 and adjacent to a moveable swash plate 61.

In operation, the operator effects control via an input lever that operates through a trunnion arm and control block, which causes rotation of the moveable swash plate 61. For example, the swash plate 61 may rotate within a range of ±14°. With the rotation of the swash plate 61, as the pump barrel 56 rotates under the driving force of the input shaft 50, the pistons 54 extend and contract against a thrust bearing 59 which is supported by the swash plate 61 to drive the hydraulic fluid in and out to pump the hydraulic fluid through the end block 46 to the motor 34.

Figure 8:
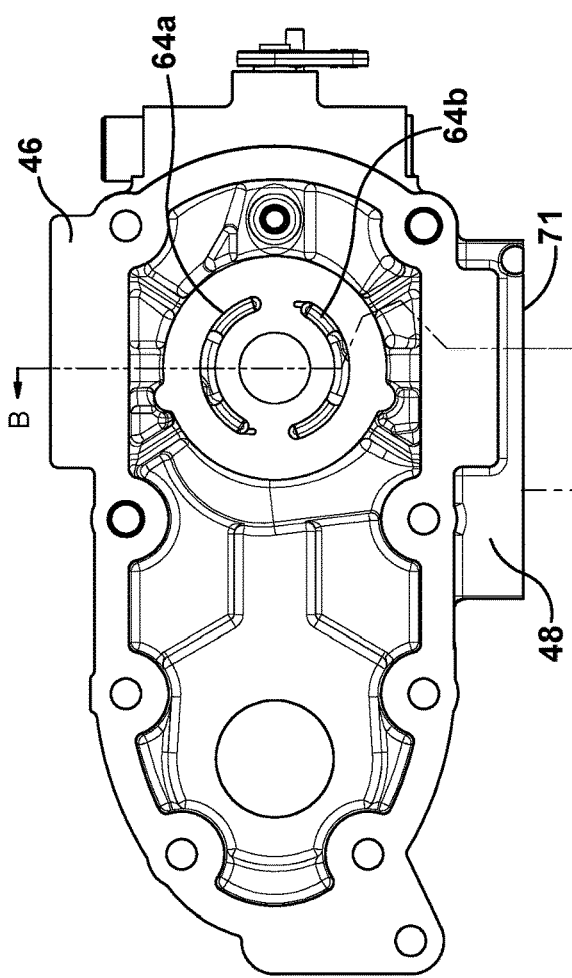
FIG. 8 is an exploded top plan view of the pump end cover and porting manifold in FIG. 7.
Figure 9:
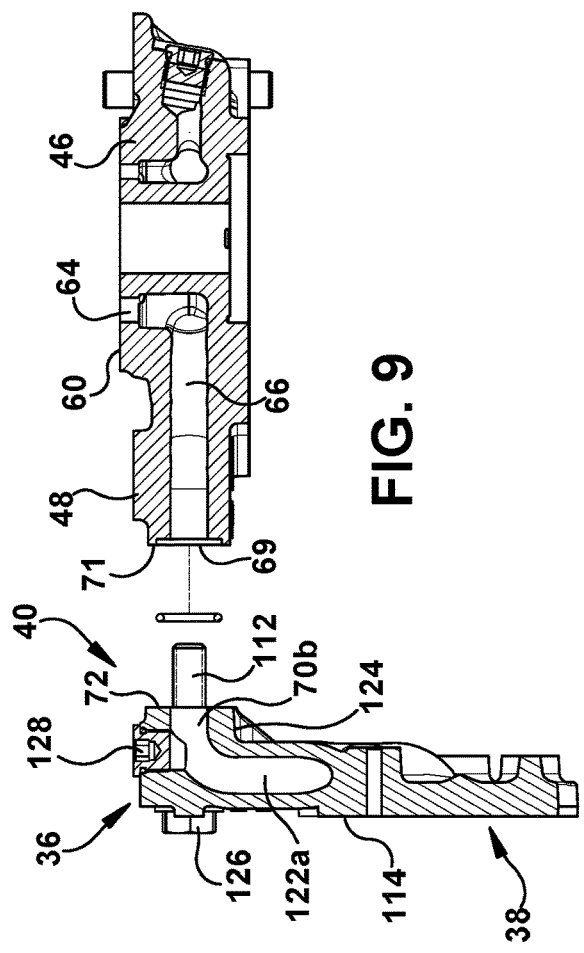
FIG. 9 is an exploded cross-sectional view of the pump end cover and porting manifold taken along the line B-B in FIG. 8.

Referring particularly to FIGS. 7-16, the pump running face 60 constitutes a pump interfacing portion, which includes first and second kidney ports 64a and 64b that extend through the pump running face 60 for interfacing with a pump, and constitute the openings for first and second internal passages 66 of the end block 46 (as shown in the cross-sectional view of FIG. 9, for example). As shown in FIG. 9 for example, the internal passages 66 extend from the kidney ports 64a and 64b on the pump running face 60, through the pump end block 46, and through the outer pump manifold 48 to connect with ports 69a and 69b (shown in FIG. 7), which open outwardly for aligning with and fluidly connecting to the corresponding pump ports 70a and 70b (shown in FIG. 17) when the mating surface 71 of the pump manifold interfaces with the mating surface 72 of the pump interfacing section 40 of the porting manifold 36. As shown, the end block 46 also may include one or more valve ports for receiving valves or plugs (e.g., 67), such as valve ports for receiving relief valves/plugs or a port for receiving a bypass valve, for example.

The kidney ports 64a and 64b provide a fluid connection with the pump for the ingress or egress of hydraulic fluid into the end block 46 via the manifold 38. For example, in an exemplary operation of fluid flow, the pump 32 may provide fluid flow to port 64a for driving the motor in the forward direction (clockwise rotation of the transmission output shaft when looking at the output shaft), and the pump 32 may provide flow to port 64b for driving the motor in the reverse direction (counterclockwise rotation of the transmission output shaft when looking at the output shaft). Commensurately, as described in further detail below, the porting manifold 36 may include corresponding internal fluid passages 122a, 122b (shown in FIG. 21) for communicating outgoing and return flow to the motor 34 via corresponding motor ports 82a, 82b (shown in FIG. 20) on the motor interfacing portion 38, which serves as an end cover for the motor 34.

Figure 19:
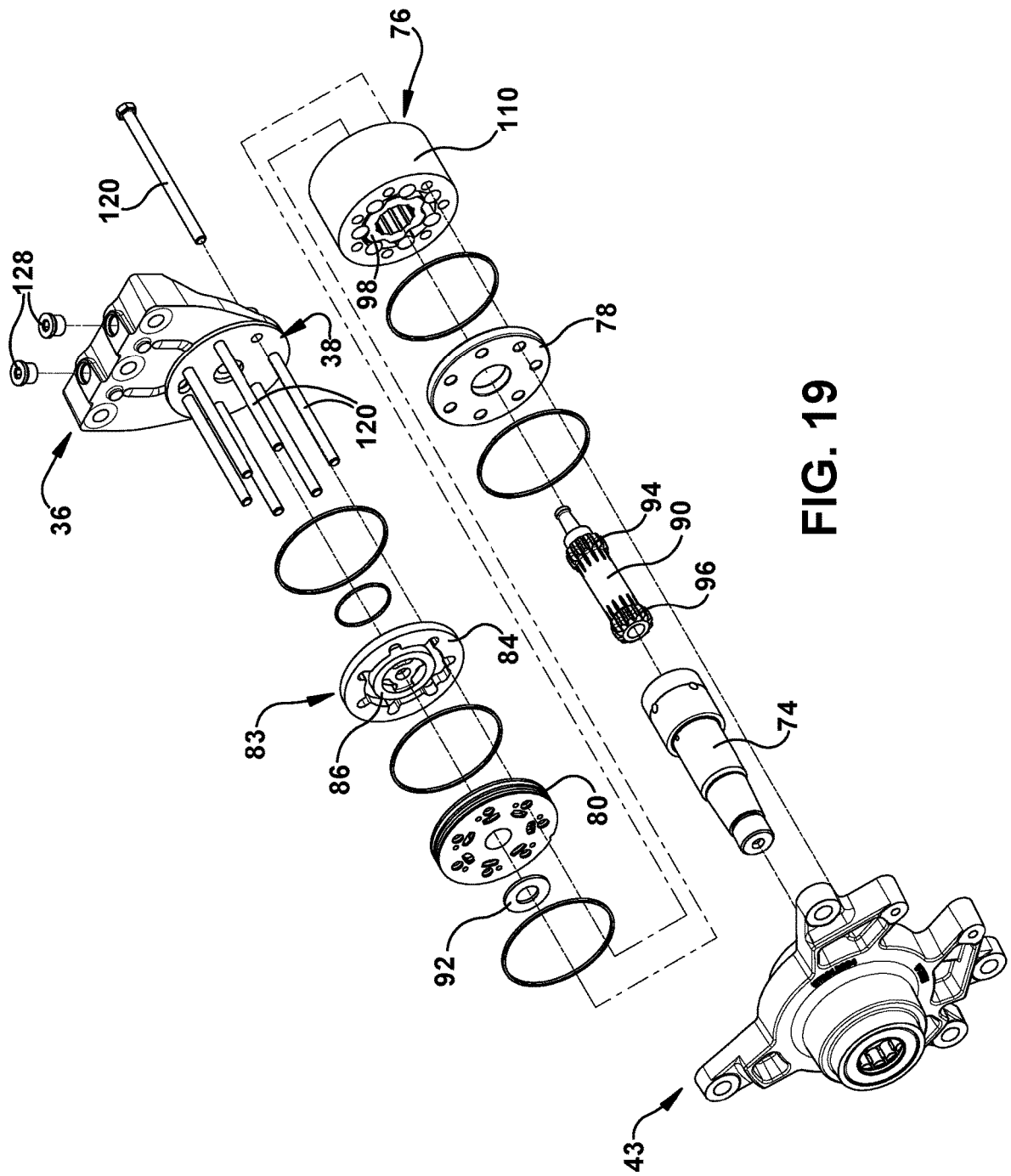
FIG. 19 is an exploded perspective view of the motor and porting manifold in FIG. 17.

Referring again to FIGS. 5 and 6, and also to FIG. 19, the exemplary hydraulic motor assembly 34 is described in further detail. As shown, the motor assembly 34 may include the motor subassembly portion 42 and the motor housing 43 that receives an output shaft 74. The output shaft 74 extends through the motor housing 43 for ultimately driving a wheel hub, either directly or through a gear reduction assembly as are known in the art. The motor subassembly 42 includes a plurality of motor components including a rotor set subassembly 76, which is described in more detail below. The rotor set sub-assembly 76 is secured to the motor housing 43 via a wear plate 78. A manifold 80 includes motor flow ports that receive hydraulic fluid from the motor ports 82a, 82b (shown in FIG. 20) on the motor interfacing section 38 of the porting manifold 36. The manifold 80 is supported adjacent a commutator assembly 83 including a commutator ring 84 that encloses a commutator 86 and sealed with a commutator seal, and communicates the hydraulic fluid to the rotor set via the manifold 80. The motor components further include a drive link 90 that is supported in position at least in part with a thrust washer 92. The drive link 90 includes first splines 94 that interface with the inner rotor of the motor rotor set sub-assembly 76. The drive link 90 further includes second splines 96 that interface with a cooperating spline of the output shaft 74. Through such interfacing linkages, the motor rotor drives the output shaft via acting on the drive link.

The rotor set sub-assembly 76 of the motor 34 has a gerotor configuration including an inner rotor 98 that rotates within a motor stator 100 against and relative to a plurality of roller vanes. The inner rotor 98 rotates under the force of the hydraulic fluid flow from the pump. Spaces defined between the inner rotor 98 and motor stator 100 change volume as the inner rotor 98 rotates within the motor stator 100 relative to the roller vanes. This action permits the inflow and forces the outflow of the hydraulic fluid from the motor 34, which causes the inner rotor to rotate. Splines of the inner rotor 98 interact with the first splines 94 of the drive link 90 such that the rotation of the inner rotor 98 drives the rotation of the drive link 90. As referenced above, the second splines 96 interface with a cooperating spline of the output shaft 74 in turn to drive the rotation of the output shaft 74.

Referring particularly to FIGS. 17-21, with further reference back to FIGS. 2-16, the exemplary porting manifold 36 is described in further detail. As discussed above, the porting manifold 36 has the motor interfacing 38 section configured to interface and fluidly couple with the motor 34 via the one or more motor ports 82a, 82b (shown in FIG. 20), and the pump interfacing section 40 configured to interface and fluidly couple with the pump 32 via the one or more pump ports 70a, 70b (shown in FIG. 17). The porting manifold 36 is configured to be discretely and interposingly coupled between the pump 32 and the motor 34, and includes one or more internal fluid passages 122a, 122b (shown in FIG. 21) fluidly connecting the pump ports 70a, 70b with the motor ports 82a, 82b to transmit hydraulic fluid between the pump 32 and the motor 34 for operation of the hydrostatic transmission 30.

As shown, in exemplary embodiments the pump interfacing section 40 extends along a horizontal plane (shown along the line A-A in FIG. 17) and terminates at one end at the pump mating surface 72 that is configured to interface with the corresponding mating surface 71 (shown in FIG. 7) of the pump manifold 48 of the pump 32. As shown, the pump mating surface 72 may be a planar surface disposed in a vertical plane (shown along the line B-B in FIG. 17) that is perpendicular to the horizontal plane A-A.

In the illustrated embodiment, the porting manifold 36 includes at least two pump ports 70a and 70b, although it is understood that fewer or more than two such ports may be provided. As shown, the at least two pump ports 70a, 70b may be laterally spaced apart in the same horizontal plane A-A and may be configured to align with the at least two corresponding ports 69a, 69b on the pump manifold 48 that are also in the same horizontal plane when the porting manifold 36 is mounted to the pump 32 (as shown in FIG. 2, for example). More specifically, as shown in the illustrated embodiment, at least two pump ports 70a, 70b are each disposed in respective laterally spaced apart lateral planes (shown along the lines C-C and D-D in FIG. 17, respectively) that are each vertically oriented and perpendicular to the vertical plane B-B, in which the horizontal plane A-A having the at least two pump ports is perpendicular to the vertical plane and the lateral planes. Such a configuration allows the modular porting manifold to be more simply constructed with shorter and less complex internal fluid passages. Similarly, the configuration of the pump end block may be more simply constructed with all of the internal fluid passages in a single horizontal plane, which reduces complexity and cost. Accordingly, such configurations may enhance the ease of manufacture of the end block and the modular porting manifold, particularly using conventional sand-casting processes that are known in the art.

The pump interfacing section 40 of the modular porting manifold 36 may include one or more fastening receivers 110 that are configured to receive fastening elements 112 (shown in FIGS. 2 and 7) for removably mounting the modular porting manifold 36 to the pump 32. In the illustrated embodiment, the fastening receivers 110 are configured as through holes in the pump interfacing section 40 configured for receiving the fastening elements 112, which are configured as bolts. The fastening elements 112 may have suitable threads for being threadably fastened into corresponding threaded bores in the pump manifold 48 for securing the porting manifold 36 to the pump 32. It is understood, however, that other types of fastening elements and fastening receivers may be employed, and that the porting manifold 36 may be secured with suitable fasteners to other portions of the pump 32. It is furthermore understood that although the porting manifold 36 is shown mounted vertically relative to the pump 32 and end block 46, with the pump ports 70a, 70b in a horizontal plane, other mounting orientations are possible. Thus, it is understood that reference to positional terms such as "vertical" or "horizontal" as used herein is intended to refer to an arbitrary relative frame of reference, rather than to the ordinary gravitational frame of reference.

The motor interfacing section 38 of the porting manifold will be described in further detail. As discussed above, the motor interfacing section 38 of the porting manifold 36 is configured to form an end cover for the motor 34, and more particularly the motor subassembly 42 to which the porting manifold 36 is adjacently secured. Also as discussed above, the motor interfacing section 38 has the one or more motor ports 82a, 82b that are configured to open into the motor 34, more particularly the motor subassembly 42, such as at the commutator assembly 83, when the motor 34 is secured to the porting manifold 36. As such, the motor 34 fluidly connects with the one or more motor ports 82a, 82b of the porting manifold 36, such that the motor ports 82a, 82b communicate hydraulic fluid through the end of the motor 34 to supply and return hydraulic fluid to enable operation of the hydrostatic transmission. Such a configuration, in which the porting manifold 36 serves as the end cover of the motor 34, allows for the porting manifold 36 to support the motor 34, and also provides a direct fluid connection with the motor without the need for external hoses or other complex fluid passages. Such a configuration also allows the motor 34 to be pre-assembled to the modular porting manifold 36 to form a motor sub-assembly that can be modularly coupled to many different pump configurations via the pump manifold 48, as discussed in further detail below.

In the illustrated embodiment, the motor interfacing section 38 includes a motor mating surface 114 that is configured to engage with the motor subassembly 42 of the motor 34, such as adjacent to the commutator assembly 83. As shown, the motor mating surface 114 is a planar surface that extends along a second vertical plane (shown along line E-E in FIG. 17, for example) that is offset and parallel to the vertical plane B-B, and which is also perpendicular to the horizontal plane A-A. In this manner, the motor interfacing section 38 may be configured to extend vertically to connect with the horizontally extending pump interfacing section 40, such that the porting manifold 36 has a generally L-shaped body in cross-section (taken along the plane C-C, for example). As shown, the motor 34 may have a cylindrical configuration that extends along a longitudinal axis, L, and may be secured perpendicularly to the motor interfacing section 38 at a positional elevation that is lower in elevation than the pump 32 (as shown in FIG. 2 for example). Again, it is understood that although the porting manifold 36 is shown mounted vertically relative to the motor 34, other mounting orientations are possible, and thus the reference to positional terms such as "vertical" or "horizontal" refer to an arbitrary relative frame of reference, rather than to the ordinary gravitational frame of reference.

In exemplary embodiments, the motor mounting surface 114 may constitute a motor running face (also referred to with reference numeral 114) that is configured to act as an interface between the body of the porting manifold 36 and the motor components (shown in FIG. 19). More particularly, the motor running face 114 may be encompassed by an end portion of the motor subassembly 42 of the motor 34, and may be configured to permit rotation of the internal rotor set 76 of the motor 34 adjacent to the motor running face 114 when in use. In the illustrated embodiment, the motor running face 114 includes the motor ports 82a and 82b. As shown, the first motor port 82a has a circular opening with a tapered recess 116, and is disposed centrally of the motor running face 114. The second motor port 82b has an elongated opening in which fluid may be dispensed at an angle in the radial direction into the motor 34, and is disposed radially outwardly of the first port 82a. In the illustrated embodiment, both ports 82a and 82b provide supply and return because the pump 32 is an over-center design creating flow in both directions. In this manner, when one flow path is high pressure (supply) the opposite is low pressure (return). Depending on the direction of vehicle travel (forward or reverse) and the corresponding stroke on the pump swash (positive or negative angle) the sides will switch back and forth from high to low.

The motor interfacing section 38 may include one or more fastening receivers 118 that are configured to receive fastening elements 120 (shown in FIG. 17, for example) for removably mounting the motor 34 to the modular porting manifold 36. In the illustrated embodiment, the fastening receivers 118 are configured as seven through-holes in the motor running face 114 for receiving the corresponding fastening elements 120, which are configured as bolts. The bolts may have suitable threads for being threadably fastened into corresponding threaded bores inside of the motor housing 43 for securing the motor 34 to the porting manifold 36. It is understood, however, that other types of fastening elements and fastening receivers may be employed, and that the motor 34 may be secured with suitable fasteners to other portions of the porting manifold 36.

Figure 21:
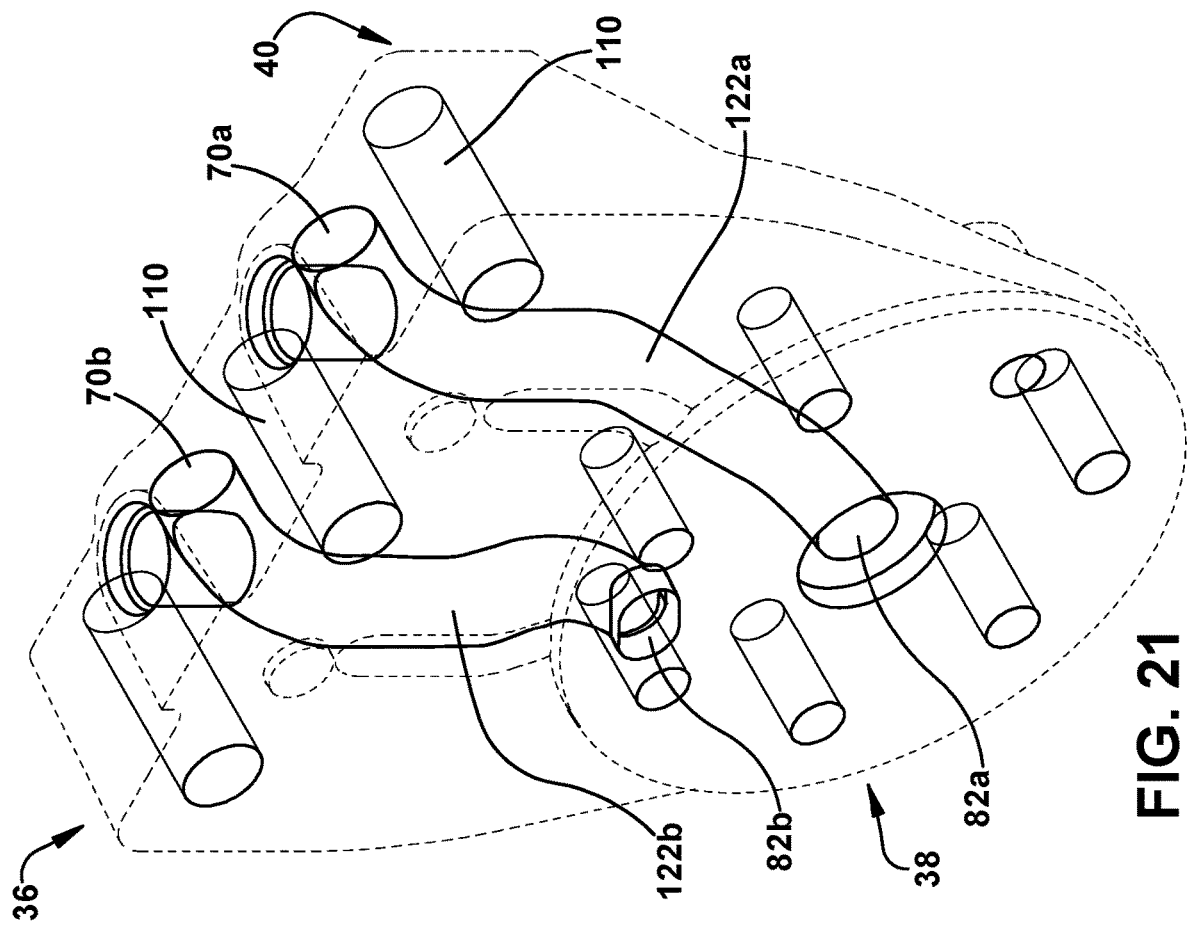
FIG. 21 is a transparent view of the exemplary porting manifold showing internal fluid passages.

Referring particularly to FIG. 21, the internal fluid passages 122a, 122b of the porting manifold 36 are shown in further detail in the transparent view. As shown, the internal fluid passages 122a, 122b fluidly connect the motor ports 82a and 82b with the corresponding pump ports 70a and 70b, which thereby provides the fluid connection between the pump 32 and the motor 34 that enables operation of the hydrostatic transmission. As discussed above, the porting manifold 36 may have a generally L-shaped body in cross-section, in which the internal fluid passages 122a and 122b are configured to extend through the porting manifold body to fall in elevation from the respective pump ports 70a, 70b to the respective motor ports 82a, 82b along an S-shaped path.

In the illustrated embodiment, the pump interfacing portion 40 with the pump ports 70a, 70b may have a relatively short horizontally extending flange section 124. In addition, the motor interfacing section 38 with the motor ports 82a, 82b may have a relatively thin cross-section. As such, the internal fluid passages 122a, 122b may have a relatively simple construction, making the porting manifold easier to fabricate from traditional manufacturing techniques, such as sand-casting. During such a sand-casting process, the internal fluid passages connected to the pump ports 70a, 70b may be formed to extend from the pump mating surface 72 through an opposite front face 126 of the porting manifold, and subsequently these openings formed in the front face 126 may be plugged with suitable plugs. In the illustrated embodiment, the porting manifold includes magnetic plugs 128 for closing the openings in the front face 126. As shown, the magnetic plugs 128 are at least partially disposed within the one or more internal fluid passages 122a, 122b to capture debris contained in the hydraulic fluid.

In exemplary embodiments, the porting manifold 36 has a unitary body formed by the pump interfacing section 40 and the motor interfacing section 38, which improves the ease of manufacture of the porting manifold 36, particularly with traditional sand-casting techniques. The porting manifold 36 also may be configured to minimize weight and thereby costs. For example, the porting manifold 36 may have a rounded bottom that may generally contour to the cylindrical shape of the motor subassembly 42, such that the porting manifold 36 has a generally U-shaped configuration when viewing the front face 126. The motor interfacing section 34 may constitute a major body portion of the porting manifold (e.g., a majority of the manifold body), and may be formed to have a relatively thin cross-section between a front side (e.g., 126) and an opposite rear side (e.g., 130), both of which may be generally planar vertical surfaces (as shown in FIG. 8, for example). Because the major body portion may be configured to minimize cross-sectional thickness, the front side (e.g., 126) and the opposite rear side (e.g., 130) may each have raised surfaces 132 (shown in FIGS. 17 and 20) that are provided for increasing the thickness in those areas of the body corresponding to the internal fluid passages 122a and 122b.

As discussed above, providing the porting manifold 36 as the end cover of the motor 34 allows for a simpler direct fluid connection with the motor 34. In addition, the porting manifold 36 supports the motor 34, such that all of the hydraulic separating forces from the motor may be directly reacted into the porting manifold 36 only, as opposed to such forces being transferred to the pump housing 44 and related housing components. In addition, such a configuration also allows the motor 34 and porting manifold 36 to be pre-assembled into a motor sub-assembly that can be modularly coupled to many different pump configurations having the same or similar pump manifold interface across the different pump configurations, which enhances the modularity and flexibility of design of the hydrostatic transmission, and minimizes manufacturing costs.

Alternatively or additionally, the motor interfacing section 38 of the modular porting manifold 36 may be configured to be the same or similar across many different motor configurations to allow the same modular porting manifold to serve as the motor end cover for different motor subassemblies across many different motor configurations (as shown in FIGS. 23-26, for example).

The external nature of the modular porting manifold and/or motor sub-assembly also results in enhanced modularity and versatility as compared to conventional configurations. For example, because the motor is mounted to the porting manifold externally of the pump housing, the motor and/or porting manifold can be changed easily to accommodate different vehicle configurations and power needs. Generally, the configuration of the modular porting manifold and/or motor subassembly provides for an overall modular design, allowing easy assembly and removal of the various parts. This results in maintenance activities being less complicated and time consuming.

Accordingly, another aspect of the present disclosure provides a method of modularly assembling a plurality of hydrostatic transmissions. Such method may include providing a plurality of motor subassemblies, in which each motor subassembly includes the same porting manifold and a motor coupled to the porting manifold. The method also includes providing a plurality of hydraulic pumps, in which at least some of the plurality of hydraulic pumps are different, except that each different pump includes the same pump manifold interface that is configured to interface with the pump interfacing section of the modular porting manifold to enable fluid communication therebetween. In this manner, such modular assembling of the hydrostatic transmissions may be accomplished by securing each one of the plurality of motor subassemblies to a corresponding hydraulic pump interface outside the housings of each pump.

Referring now to FIGS. 22-26, different exemplary embodiments of hydrostatic transmissions are shown, in which the same or similar modular porting manifolds are used to fluidly connect a pump to a motor having a different configuration than the motor 34 described above.

Figure 22:
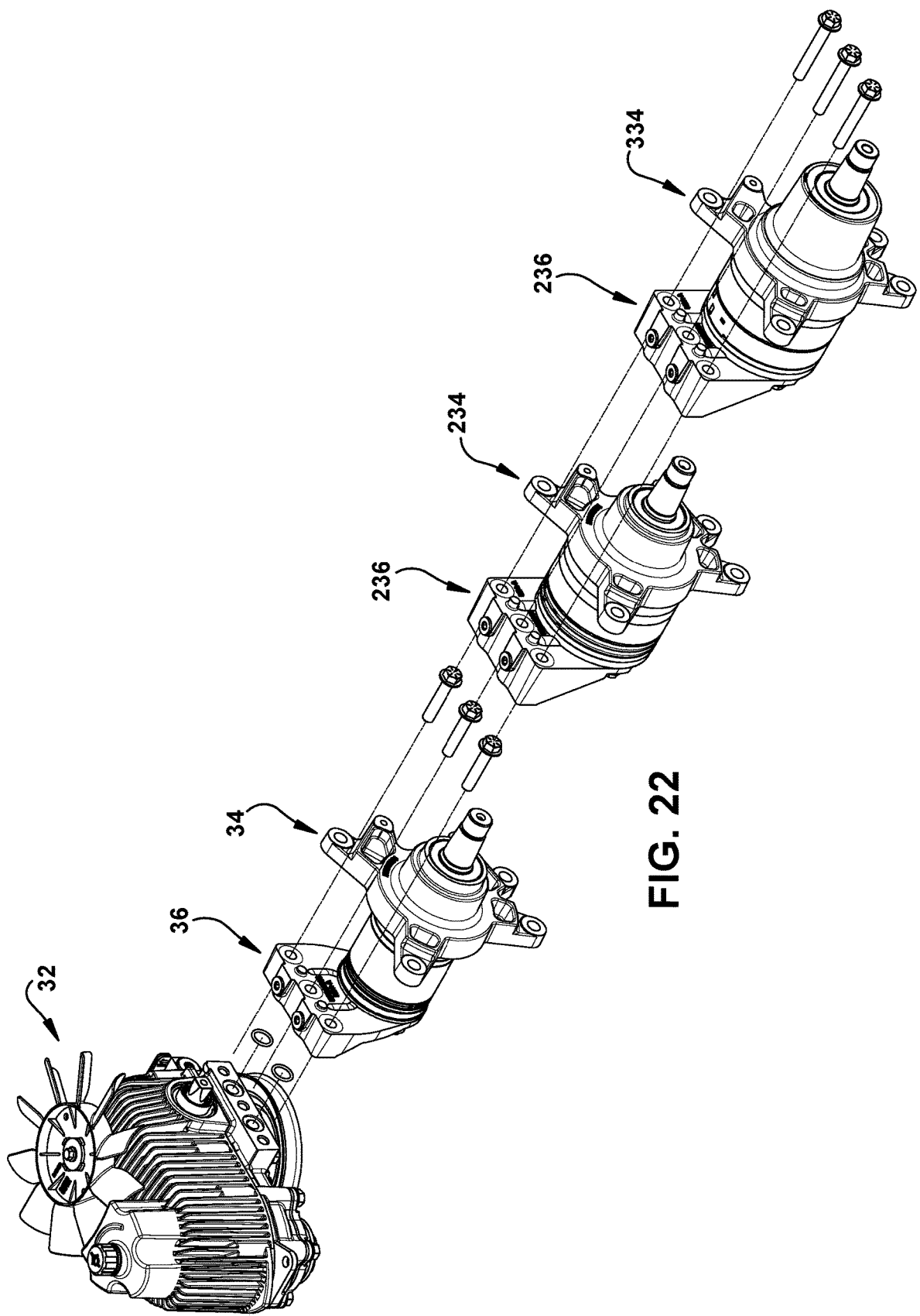
FIG. 22 is a perspective view of different motors modularly adapted to the same pump via a modular porting manifold according to an aspect of the disclosure.

Referring to FIG. 22, the modularity of the different motors using the same or similar modular porting manifold as described above is shown. In the illustrated example, the motor 34 and porting manifold 36 are the same as those described above. As shown, the motor 34 is a smaller, relatively light-duty motor compared to motors 234 and 334, which are described below.

Figure 23:
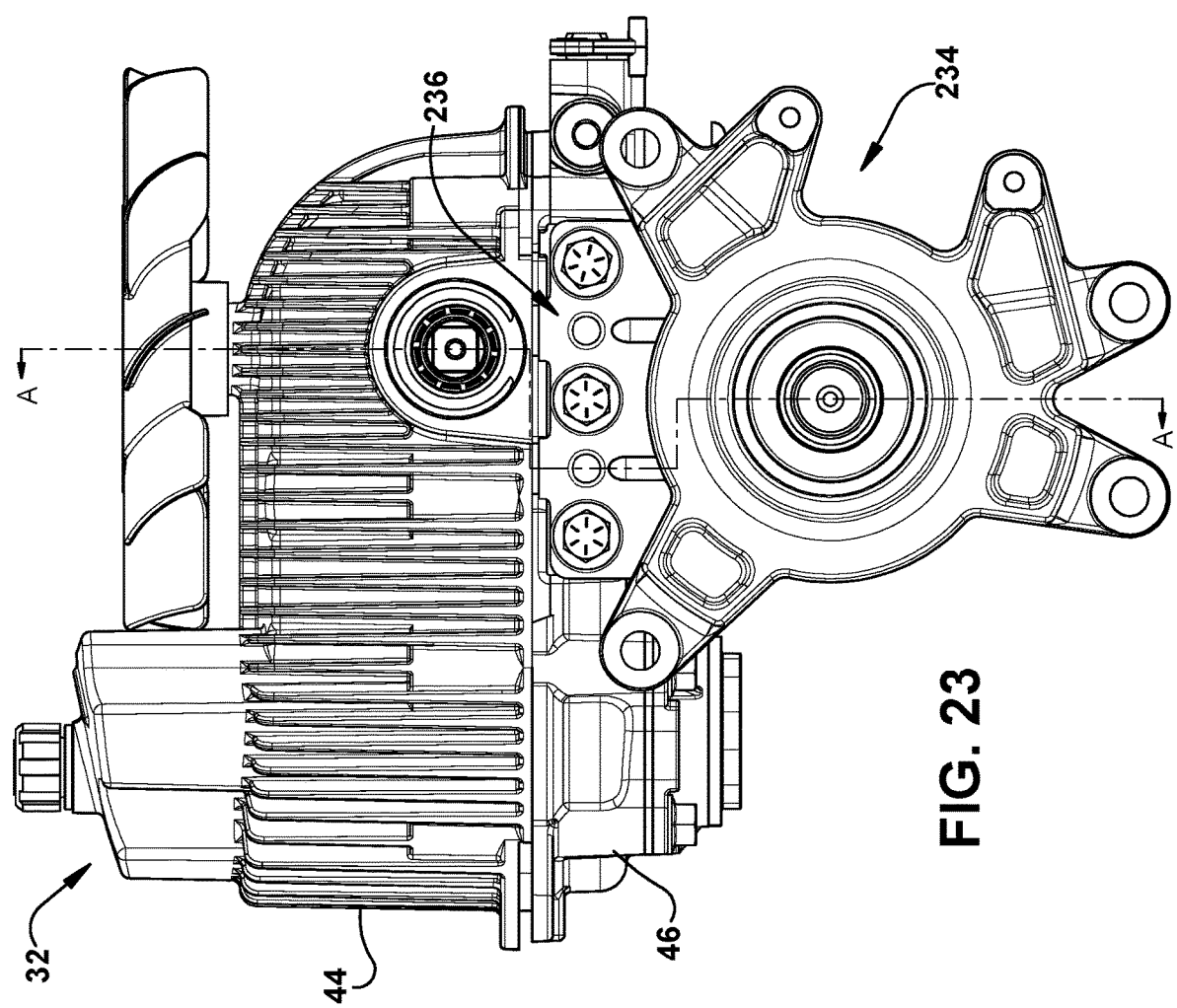
FIG. 23 is a side plan view of another exemplary embodiment of a hydrostatic transmission having one of the motors and corresponding porting manifold connected to the pump in FIG. 22.
Figure 24:
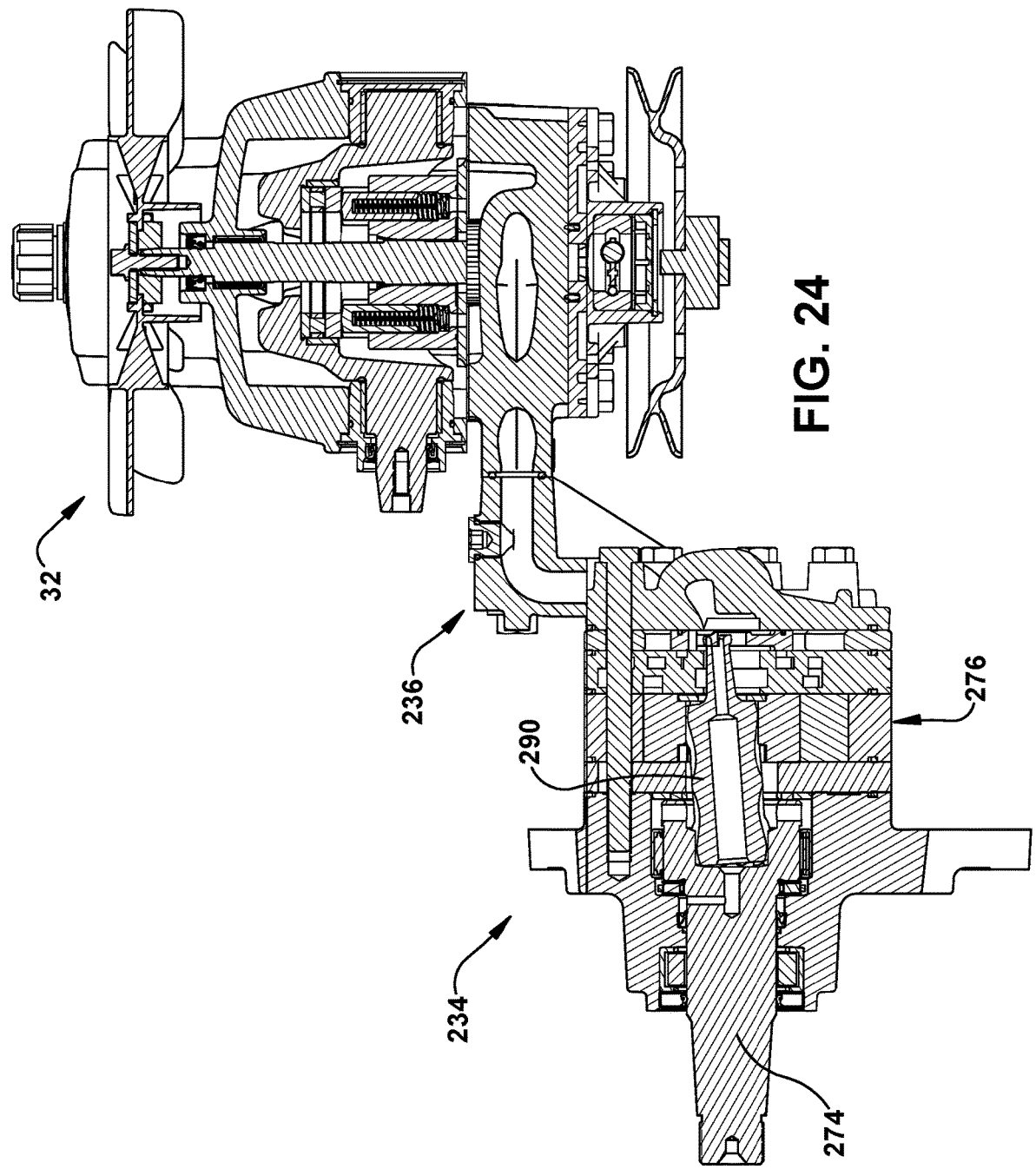
FIG. 24 is a cross-sectional side view taken along the line A-A in FIG. 23.

Referring to FIGS. 23 and 24, another exemplary embodiment of a hydrostatic transmission 230 is shown. The hydrostatic transmission 230 is similar to the above-referenced hydrostatic transmission 30, and consequently the same reference numerals but indexed by 200 are used to denote structures corresponding to similar structures in the hydrostatic transmissions. In addition, the foregoing description of the hydrostatic transmission 30 equally applicable to the hydrostatic transmission 230 except as noted below.

Figure 25:
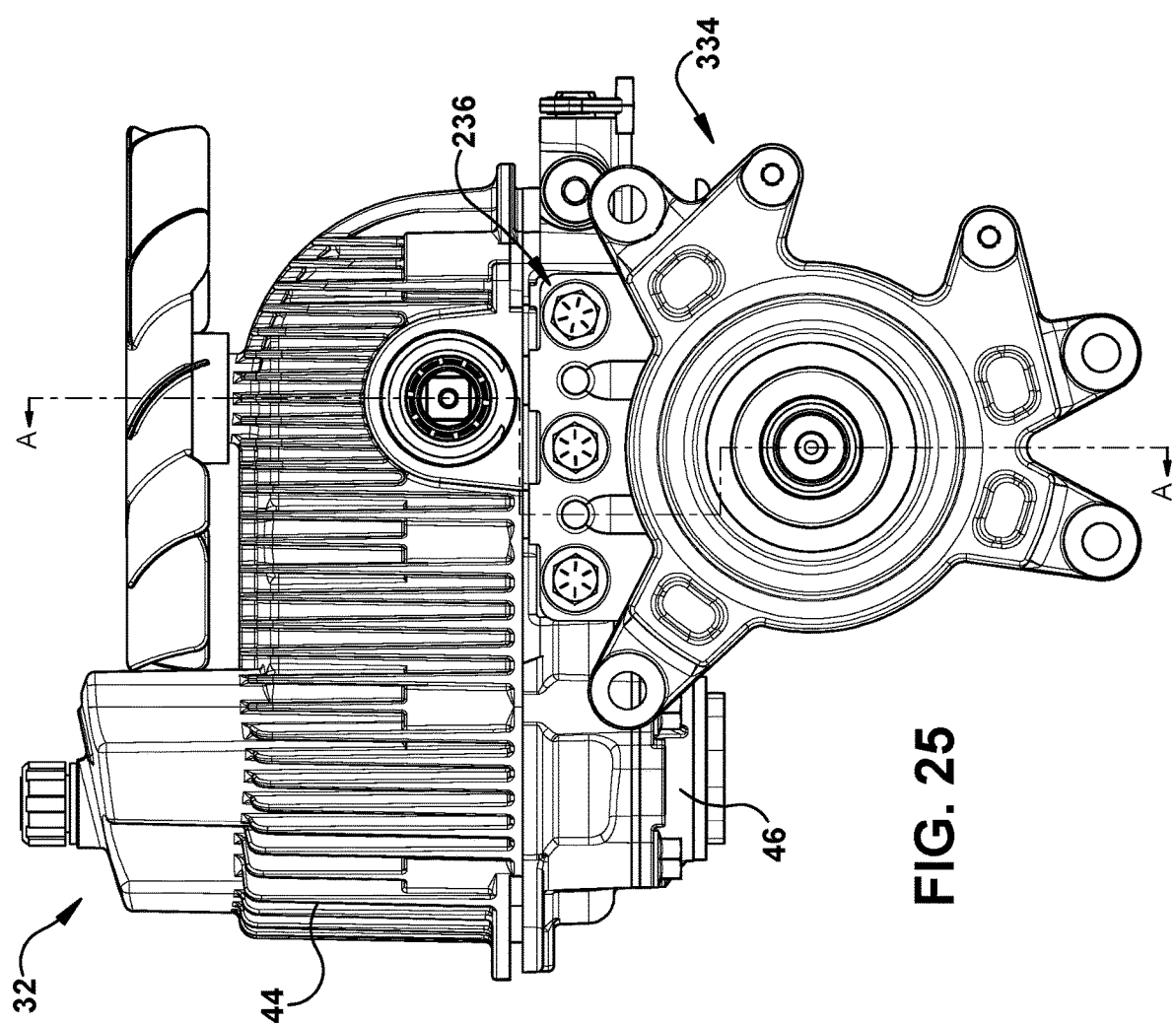
FIG. 25 is a side plan view of another exemplary embodiment of a hydrostatic transmission having one of the motors and corresponding porting manifold connected to the pump in FIG. 22.
Figure 26:
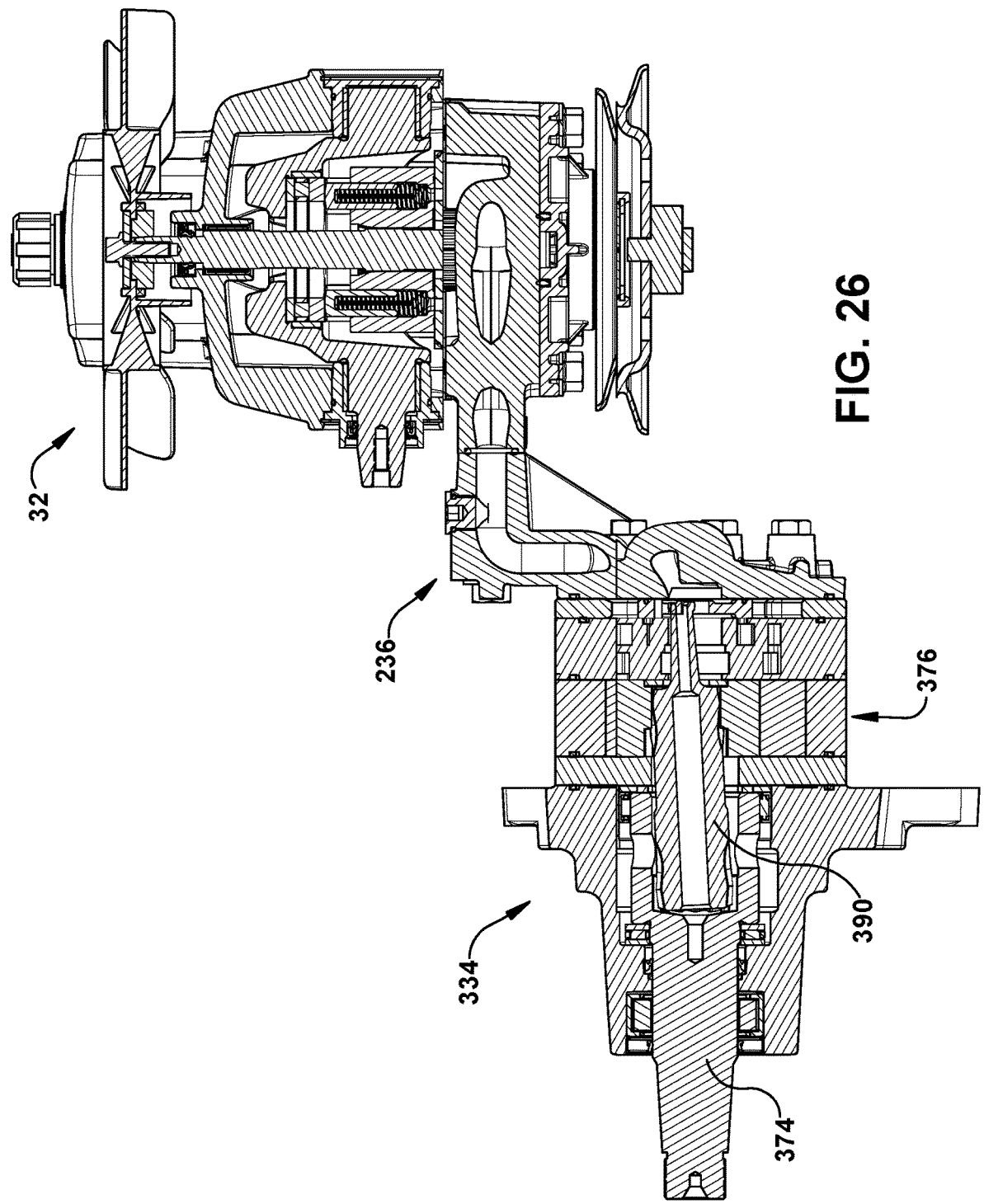
FIG. 26 is a cross-sectional side view taken along the line A-A in FIG. 25.

In the illustrated embodiment, the pump 232 of the hydrostatic transmission 230 is the same pump 32 in the hydrostatic transmission 30. The motor 234 is a larger, more heavy-duty motor than the motor 34, and consequently the porting manifold 236 has a thicker pump interfacing section 40 to support the weight of the larger motor 234. The remaining features of the porting manifold 236 and the motor 234 are the same or substantially similar as those in the embodiment of the hydrostatic transmission 30 described above. Referring to FIGS. 25 and 26, another exemplary embodiment of a hydrostatic transmission 330 is shown. The hydrostatic transmission 330 is similar to the above-referenced hydrostatic transmission 30, and consequently the same reference numerals but indexed by 300 are used to denote structures corresponding to similar structures in the hydrostatic transmissions. In addition, the foregoing description of the hydrostatic transmission 30 equally applicable to the hydrostatic transmission 330 except as noted below.

In the illustrated embodiment, the pump 332 of the hydrostatic transmission 330 is the same pump 32 in the hydrostatic transmission 30. The motor 334 is a larger, more heavy-duty motor than the motor 34, and consequently the porting manifold 236 has a thicker pump interfacing section 40 to support the weight of the larger motor 334. As shown with reference to FIG. 22, the porting manifold 236 is the same porting manifold as in the hydrostatic transmission 230, and allows for modular adaption for the different style motor 334. The remaining features of the porting manifold 236 and the motor 334 are the same or substantially similar as those in the embodiment of the hydrostatic transmission 30 described above.

While a preferred form or forms of an exemplary porting manifold, motor, motor subassembly, pump and/or hydrostatic transmission have been described above, it should be apparent to those having ordinary skill in the art that other porting manifold, motor, motor subassembly, pump and/or hydrostatic transmission designs could also be used in accordance with the present disclosure. As such, the principles and aspects of the present disclosure are not limited to any particular porting manifold, motor, motor subassembly, pump and/or hydrostatic transmission design, but rather is appropriate for a wide variety of porting manifolds, motors, motor subassemblies, pumps and/or hydrostatic transmissions.

Furthermore as discussed above, it is understood that positional terms such as "top," "bottom," "upper," "lower," "left," "right," "front," "rear," "horizontal," "vertical," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference depending on the transmission configuration, as understood by those having ordinary skill in the art.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission, comprising:
a hydraulic pump having a pump housing and a pump end block connected to the pump housing, the pump end block having an outer pump manifold with one or more ports opening outwardly of the pump end block and the pump housing;
a hydraulic motor having a motor housing and an output shaft extending outwardly of the motor housing; and
a porting manifold coupled to each of the hydraulic pump and the hydraulic motor, the porting manifold being discrete with respect to each of the pump and the motor, and being interposed between the pump and the motor outside of the pump housing, the porting manifold having a motor interfacing section that interfaces with the motor, and a pump interfacing section that interfaces with the pump; wherein:
the motor interfacing section forms an end cover for the motor, the motor interfacing section having one or more motor ports opening into the motor for communication of hydraulic fluid with the motor;
the pump interfacing section interfaces with the outer pump manifold of the pump, the pump interfacing section having one or more pump ports aligned with a corresponding one or more ports on the pump manifold for communication of hydraulic fluid with the pump; and
the porting manifold having one or more internal fluid passages fluidly connecting the pump ports of the pump interfacing section with the motor ports of the motor interfacing section for enabling fluid communication between the pump and the motor.

2. The hydrostatic transmission according to claim 1, wherein the porting manifold includes at least two pump ports, at least two motor ports, and at least two internal passages connecting the pump ports to the motor ports; and
wherein the pump interfacing section of the porting manifold has a pump mating surface that interfaces with a corresponding mating surface of the pump manifold, the pump mating surface of the porting manifold having the at least two pump ports, in which at least two pump ports are laterally spaced apart in the same horizontal plane to align with at least two corresponding ports on the pump manifold that are also in the same horizontal plane.

3. The hydrostatic transmission according to claim 2, wherein the pump mating surface of the porting manifold is a planar surface disposed in a vertical plane, and at least two pump ports are each disposed in respective laterally spaced apart lateral planes that are each vertically oriented and perpendicular to the vertical plane, in which the horizontal plane having the at least two pump ports is perpendicular to the vertical plane and the lateral planes.

4. The hydrostatic transmission according to claim 1, wherein the pump interfacing section extends along a horizontal plane and terminates at one end at a pump mating surface that interfaces with a corresponding mating surface of the pump manifold of the pump, in which the pump mating surface is disposed in a first vertical plane that is perpendicular to the horizontal plane; and
wherein the motor interfacing section extends along a second vertical plane that is offset and parallel to the first vertical plane, and is perpendicular to the horizontal plane.

5. The hydrostatic transmission according to claim 1, wherein the motor interfacing section has a motor mating surface that engages with the motor, the motor mating surface being disposed in a vertical plane that is offset and parallel to the vertical plane having the pump mating surface.

6. The hydrostatic transmission according to claim 5, wherein the motor mating surface is a planar surface of a major body portion of the porting manifold, the major body portion having a surface that is opposite the motor mating surface that is planar and parallel with the motor mating surface.

7. The hydrostatic transmission according to claim 6, wherein the major body portion includes raised surfaces on the surface opposite the motor mating surface, the raised surfaces corresponding with the internal fluid passages extending through the porting manifold.

8. The hydrostatic transmission according to claim 1, wherein the porting manifold is a unitary body having the pump interfacing section and the motor interfacing section.

9. The hydrostatic transmission according to claim 1, wherein the one or more internal fluid passages of the porting manifold extend through a body of the porting manifold and are configured to fall in elevation from the pump ports to the motor ports along an S-shaped path, such that the motor is lower in elevation than the pump.

10. The hydrostatic transmission according to claim 1, wherein the porting manifold further includes one or more magnetic plugs at least partially disposed in the one or more internal fluid passages, the one or more magnetic plugs being configured to capture debris contained in the fluid.

11. The hydrostatic transmission according to claim 1, wherein the end cover of the motor interfacing section includes a motor running face through which the one or more motor ports open into the motor for communicating pressurized hydraulic fluid, the motor running face being configured to interface against a rotating component of the motor when in use.

12. The hydrostatic transmission according to claim 11, wherein the one or more motor ports include a first motor port disposed centrally of the motor running face, and a second motor port disposed radially outwardly of the first motor port, wherein the first motor port communicates pressurized hydraulic fluid at a first fluid pressure level and the second motor port communicates pressurized hydraulic fluid at a second fluid pressure level that is different than the first fluid pressure level when the motor is in use.

13. The hydrostatic transmission according to claim 1, wherein the pump end block has a pump running face having one or more ports extending into one or more fluid passages of the pump end block, the one or more fluid passages of the pump end block extending into the one or more ports on the pump manifold that open outwardly of the pump end block.

14. The hydrostatic transmission according to claim 1, wherein the pump end block is connected below the pump housing to form a reservoir for the pump, and the pump manifold extends outwardly from one side of the pump end block and terminates at a mating surface that interfaces with a corresponding mating surface of the pump interfacing section of the porting manifold.

15. The hydrostatic transmission according to claim 1, wherein the porting manifold has one or more fastening receivers in the pump interfacing section that are configured to receive one or more fastening elements for coupling the modular porting manifold to the pump manifold; and wherein the modular porting manifold has one or more fastening receivers in the motor interfacing section that are configured to receive one or more fastening elements for coupling the modular porting manifold to the motor.

16. A modular porting manifold for a hydrostatic transmission having a pump and a motor, the modular porting manifold comprising:

a motor interfacing section configured to interface with the motor, in which the motor interfacing section is configured to form an end cover for the motor to which the motor can be secured, the motor interfacing section having at least two motor ports configured to open into the motor for enabling fluid communication with the motor when the modular porting manifold is coupled to the motor; and a pump interfacing section configured to interface with a pump manifold of the pump, the pump interfacing section having at least two pump ports configured to cooperate with a corresponding at least two ports on the pump manifold for enabling fluid communication with the pump when the modular porting manifold is coupled to the pump;

wherein the modular porting manifold has at least two internal fluid passages fluidly connecting the at least two pump ports of the pump interfacing section with at least two motor ports of the motor interfacing section for enabling fluid communication between the pump and the motor when the modular porting manifold is coupled to each of the pump and the motor; and wherein the pump interfacing section of the modular porting manifold has a pump mating surface for interfacing with a corresponding mating surface of the pump manifold, the pump mating surface of the modular porting manifold having the at least two pump ports, in which at least two pump ports are laterally spaced apart in the same horizontal plane.

17. The hydrostatic transmission according to claim 16, wherein the pump mating surface of the modular porting manifold is a planar surface disposed in a vertical plane, and at least two pump ports are each disposed in respective laterally spaced apart lateral planes that are each vertically oriented and perpendicular to the vertical plane, in which the horizontal plane having at least two pump ports is perpendicular to the vertical plane and the lateral planes.

18. The hydrostatic transmission according to claim 16, wherein the modular porting manifold is configured to be discrete with respect to the pump and the motor, and is configured to be interposingly coupled between the pump and the motor; and wherein the pump interfacing section is configured to modularly interface with multiple different pump configurations, in which each different pump configuration has a pump manifold that is adapted for interfacing with the pump interfacing section of the porting manifold to enable fluid communication therebetween.

19. A motor subassembly for a hydrostatic transmission, comprising:

the modular porting manifold according to claim 16; and a hydraulic motor coupled to the porting manifold, the hydraulic motor having a motor housing and an output shaft extending outwardly of the motor housing;

wherein the motor interfacing section of the porting manifold forms an end cover of the motor, and the one or more motor ports are encompassed by the motor, and open into the motor for communication of hydraulic fluid with the motor.

20. A method of modularly assembling a plurality of hydrostatic transmissions, comprising:

providing a plurality of motor subassemblies according to claim 19;

providing a plurality of hydraulic pumps, in which at least some of the plurality of hydraulic pumps are different, except that each different pump includes the same outer pump manifold interface that is disposed outwardly of a housing of the pump, and is configured to interface with the pump interfacing section of the modular porting manifold to enable fluid communication therebetween; and securing each one of the plurality of motor subassemblies to a corresponding each one of the plurality of hydraulic pumps outside of the housing of the pump.

\* \* \* \* \*